United States Patent
Awad et al.

(10) Patent No.: US 9,411,780 B1
(45) Date of Patent: Aug. 9, 2016

(54) EMPLOYING DEVICE SENSOR DATA TO DETERMINE USER CHARACTERISTICS

(71) Applicant: AMAZON TECHNOLOGIES, INC., Reno, NV (US)

(72) Inventors: Nadim Awad, San Francisco, CA (US); Srinivasan Sridharan, Sunnyvale, CA (US); Kenneth Paul Kiraly, Menlo Park, CA (US); Jonathan White Keljo, Seattle, WA (US); Levon Dolbakian, Los Gatos, CA (US); Arnaud Marie Froment, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 561 days.

(21) Appl. No.: 13/908,795

(22) Filed: Jun. 3, 2013

(51) Int. Cl.
*G06F 17/18* (2006.01)
*G06Q 50/00* (2012.01)
*G06Q 50/10* (2012.01)

(52) U.S. Cl.
CPC ............... *G06F 17/18* (2013.01); *G06Q 50/01* (2013.01); *G06Q 50/10* (2013.01)

(58) Field of Classification Search
CPC .... A61B 5/4872; A61B 5/0008; A63B 24/00; G06F 19/3481; G06F 3/0451; G06K 9/00671; G06Q 30/0631; G06Q 30/0633; G06T 11/206; H04N 5/2252; H04N 5/23206; H04N 5/23219; H04N 5/23229

USPC ......... 702/127, 138, 141, 146, 149, 155, 158, 702/166, 179, 75, 116; 345/173, 440; 434/238, 257; 482/9; 600/300, 301; 707/731, 737

See application file for complete search history.

(56) References Cited

U.S. PATENT DOCUMENTS

| | | | |
|---|---|---|---|
| 7,771,320 B2 * | 8/2010 | Riley | A63B 24/0006 434/238 |
| 2008/0312511 A1 * | 12/2008 | Osler | A61B 5/0008 600/300 |
| 2014/0232677 A1 * | 8/2014 | Yamane | G06F 3/041 345/173 |
| 2015/0038806 A1 * | 2/2015 | Kaleal, III | A61B 5/4872 600/301 |

* cited by examiner

*Primary Examiner* — John H Le

(57) ABSTRACT

Techniques are described for determining height, weight, or other characteristics of a user based on processed sensor data. The sensor data may include data collected by sensors on the user's computing device or other computing devices, or data collected by stationary, external sensors. Different types of sensor data may be processed to estimate at least one physical characteristic of the user, such as the user's height, weight, apparel size, age, and so forth. The estimated characteristics may be employed to perform actions based on the user's identity or category, to customize content delivery for the user, or for other purposes.

20 Claims, 14 Drawing Sheets

EMPLOYING DEVICE SENSOR DATA TO DETERMINE USER CHARACTERISTICS

BACKGROUND

The growing popularity of online shopping has led to an increase in the number of e-commerce web sites, and has led to an increase in the number and variety of products and services offered to users on such sites. To increase the likelihood of a purchase, some e-commerce sites may attempt to focus an online user's attention on products that the user is more likely to purchase. In some instances, because of a lack of information regarding a particular user, it may be difficult to predict which products may be more desirable to the user. Moreover, in some cases a user may lack accurate information regarding his or her physical dimensions, and this may result in the ordering of unsuitable apparel or other products.

Figure 1:
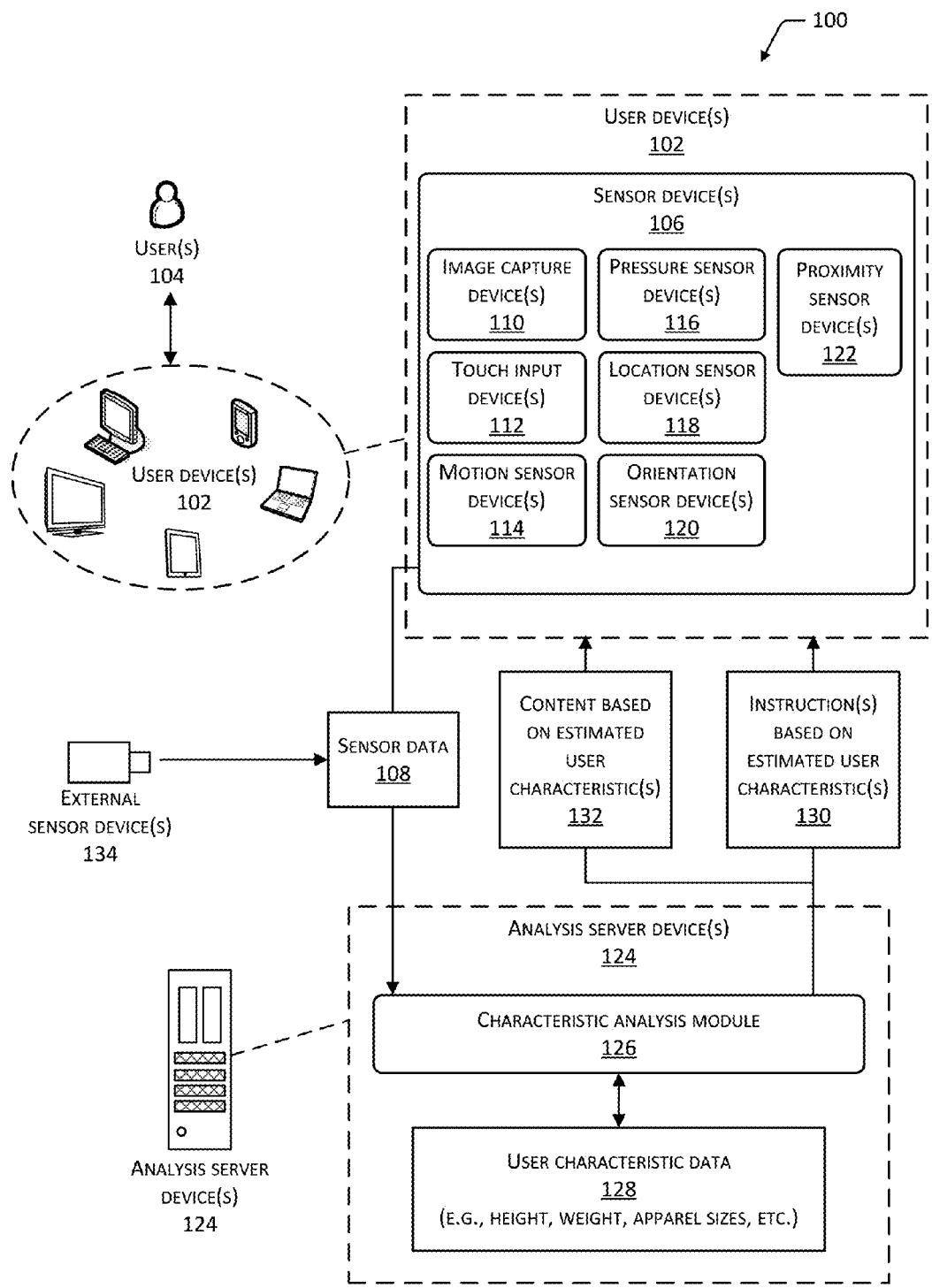
FIG. 1 depicts an environment including one or more user devices arranged with one or more sensor devices to gather sensor data regarding a user, and one or more analysis server devices to analyze the sensor data to estimate at least one user characteristic based on the sensor data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for estimating one or more characteristics of a user associated with a user device, based on analyzing sensor data collected by one or more devices that may include the user device. In the implementations described herein, one or more types of sensor data are collected and analyzed to estimate one or more characteristics of a user. The estimated user characteristics may include physical characteristics such as a height, a weight, an age, or a gender of the user. The estimated user characteristics may also include clothing or apparel sizes of the user, such as pant size (e.g., waist or inseam), shirt size, blouse size, dress size, shoe size, watch size, ring size, coat size, hat size, and so forth.

In some cases, the estimated user characteristics may include a physical capability of the user, such as whether the user walks with a cane or crutches, walks with a limp, uses a wheelchair, or is otherwise differently abled than most other individuals in a population. Moreover, in some cases the estimated user characteristics may include a particular item of apparel or accessory, or a type of apparel or accessory, worn or employed by the user. For example, the estimated user characteristics may include characteristics describing whether the user wears high heels, whether the user carries a bag, backpack, or briefcase, and so forth.

Different types of sensor data from various sources may be used to determine multiple estimates for each of a plurality of user characteristics. The multiple estimates may be processed to determine a processed estimate of the user characteristic. Processing multiple estimates may include statistically or mathematically combining or correlating the multiple estimates to determine a combined or correlated estimate. For example, a first estimate may be made of a user's height, based on analyzing image data that depicts the user. A second estimate may be made of the user's height, based on altimeter or accelerometer data measuring a change in the altitude of the user device while the user is performing an action such as engaging in a telephone call. The first and second estimates may then be combined, correlated, or otherwise processed to determine a processed estimate. For example, the processed estimate may be the average, median, mean, mode, or other mathematical combination of the first and second estimates. In some cases, the processed estimate may be more accurate than an estimate for a user characteristic that is based on one type or source of sensor data. Moreover, in some cases the sensor data, or the estimate of the user characteristic, may be stored on the user device, or on a server device (e.g., a cloud server device). In such cases, a previously made estimate of a user characteristic may be re-processed, refined, or updated based on subsequently received sensor data. In this way, implementations enable the development over time of a more accurate estimate of one or more user characteristics associated with the user.

The sensor data may include, but is not limited to, one or more of the following: image data, motion data, orientation data, touch input data, atmospheric pressure data, location data, or proximity data. Image data may be generated by a still image camera, a video camera, or another image capture device, and may include one or more still images or video segments described using any file format.

Motion data may describe a velocity, an acceleration, or a deceleration of the user device or the user in one or more directions, as measured by a motion sensor device such as an accelerometer or a gyroscopic sensor device. Motion data may also be determined based on image data that shows a change in the position of the user device or the user over time, either through multiple images captured at multiple times, or through a blurring of the user or the user device in one or more captured images. In some cases, motion data may be determined based on location data that indicates a change in the position of the user or the user device over time.

Orientation data may describe a spatial orientation of the user device, as measured by an orientation sensor device such as a gyroscopic sensor device or an accelerometer. The orientation data may indicate an orientation of the user device while it is being held by the user or otherwise.

Touch input data may describe a tactile pressure placed on the user device while the user is touching the user device, as measured by a touch input sensor. Such tactile pressure may be applied to the user device while the user is inputting information (e.g., through a touch-sensitive screen or touchpad), or while the user is holding the user device.

Atmospheric pressure data may describe an air pressure or water pressure at the user device, or describe an altitude of the user device. The atmospheric pressure data may be measured by a pressure sensor device such as a barometer, a hydrostatic pressure sensor, or an altimeter.

Location data may describe a location of the user device or of the user, as determined by a location sensor device. In some cases, the location data may be determined by a geolocation device such as a Global Positioning System (GPS) device or other satellite-based navigation systems. The location data may also be determined by a sonic transceiver or echo-location device that employs sound or ultrasound to determine a location of the user device relative to other objects. In some cases, the location data may be determined by one or more network transceivers that determine a location of the user device based on a presence or a strength of one or more network signals. The location data may also be determined based on a network address such as the Internet Protocol (IP) address of the user device. In some cases, the location data may include an altitude of the user device as measured by an altimeter, a geolocation device, or a gravimeter.

Proximity data may describe a position of the user device relative to the user. In some cases, the proximity data may indicate a distance from at least a portion of the user device to at least a portion of the user while the user is holding the user device, operating the user device, or otherwise in proximity to the user device. Proximity data may be determined by a capacitive sensor measuring a strength of an electromagnetic field that is affected by the presence of the user. Proximity data may also be determined through an infrared (IR) sensor that detects IR-frequency light emitted or reflected by at least a portion of the user.

The estimated user characteristic(s) associated with a user may be employed to perform one or more actions that are customized for the user. In some implementations, the estimated user characteristics may be employed to determine one or more items of content to present to the user through a web site or another interface. For example, an estimate of a physical characteristic such as height, weight, or clothing size may be employed to select one or more clothing products to display on an e-commerce web site, such that the displayed clothing products may be suitable for the user based on the user's estimated physical characteristic(s). In this way, implementations may enable web sites to tailor or customize their product offerings to a user even in circumstances when information regarding the user's purchase history, tastes, interests, or preferences is unavailable.

Implementations also support other types of actions that are performed based on the estimated user characteristic(s). In some implementations, a user may be identified based at least partly on the estimated user characteristic(s). For example, a user's height, weight, or other physical characteristics may be employed to identify the user. Following the identification of the user, one or more user interface elements or other device features may be customized based on the user's preferences.

Moreover, in some implementations, a user category may be determined for the user based on the estimated user characteristic(s). For example, in some cases an age or an age range of the user may be estimated based at least partly on the user's estimated height, weight, and so forth. Based on the estimated age, access to at least a portion of the user device, or at least one function of the user device, may be restricted or otherwise controlled for users below a threshold age. Implementations support other types of actions that are performed based on one or more estimated user characteristics.

FIG. 1 depicts an environment 100 including one or more user devices 102. Each of the user device(s) 102 may be associated with at least one user 104. The user(s) 104 may include any individual or group of individuals who own, operate, manage, or are otherwise associated with the user device(s) 102. The user device(s) 102 may be any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth. An example of the user device(s) 102 is described further with reference to FIG. 2.

The user device(s) 102 may each include one or more sensor device(s) 106, which gather sensor data 108. The sensor data 108 may include any information that describes the user device(s) 102, the user(s) 104, other objects in proximity to the user device(s) 102, or the environs of the user device(s) 102. The sensor device(s) 106 may include any type of device arranged to collect any type of the sensor data 108.

The user 104 of a user device 102 may control whether, or under what circumstances, the sensor data 108 is gathered. In some implementations, the sensor data 108 may be gathered if the user 104 gives explicit permission for the gathering of the sensor data 108 (e.g., if the user opts in to the data collection). Alternatively, the gathering of the sensor data 108 may be discontinued or suspended if the user 104 indicates that he or she prefers such data not to be gathered (e.g., if the user opts out of the data collection). In either case, the user 104 may also express preferences that certain types of the sensor data 108 may be gathered, and that certain types of the sensor data 108 may not be gathered. The user 104 may also indicate particular times of day, days of the week, or other time periods during which the sensor data 108 may or may not be collected.

In some implementations, the sensor device(s) 106 may include one or more image capture devices 110 such as a still image camera, a video camera, a strip imaging device, a photodetector, or any other device that senses light or electromagnetic energy. The image capture device(s) 110 may generate image data in any format, including but not limited to digital formats such as the Joint Photographic Experts Group (JPEG) standard format, the Graphics Interchange Format (GIF) developed by CompuServe® of Columbus, Ohio, the Portable Network Graphics (PNG) format, and the bitmap image file (BMP) format developed by Microsoft® Corp. of Redmond, Wash. The image capture device(s) 110 may detect electromagnetic energy in any frequency range, including visible light, infrared light, ultraviolet light, and so forth.

The sensor device(s) 106 may include one or more touch input devices 112. The touch input device(s) 112 may detect and measure a tactile pressure placed on the user device 102 while the user 104 is touching, gesturing to, or otherwise interacting with the user device 102. For example, the user device 102 may include a touch-sensitive display or touchscreen that includes a touch input device 112, enabling a user to enter data and commands through the touch-sensitive display. The user device 102 may also include a touch pad that is separate from a display. In some cases, the touch input device(s) 112 may include one or more sensors that measure a pressure generated by the user 104 while gripping or holding the user device 102. The touch input device(s) 112 may incorporate any technology used to detect and measure tactile pressure placed on the user device 102, including but not limited to resistive touch sensors and capacitive touch sensors.

The sensor device(s) 106 may include one or more motion sensor devices 114, arranged to detect and measure one or more motions or movements of the user device 102. The motion sensor device(s) 114 may measure a linear velocity or acceleration of the user device 102 in any direction, or an angular velocity or acceleration of the user device 102 relative to any axis. The motion sensor device(s) 114 may include, but are not limited to, tilt meters, gravimeters, accelerometers, and gyroscopic sensor devices. Acceleration may include a positive or a negative acceleration (e.g., a deceleration).

The sensor device(s) 106 may include one or more atmospheric pressure sensor devices 116, which provide atmospheric pressure data. In some implementations, the atmospheric pressure data may include measurements of air pressure, water pressure, or any other type of fluid or gas pressure at the user device 102 or in proximity to the user device 102. In some cases, the pressure sensor device(s) 116 may indicate an altitude of the user device 102. The pressure sensor device(s) 116 may include, but are not limited to, a barometer, a hydrostatic pressure sensor, or an altimeter.

The sensor device(s) 106 may include one or more location sensor devices 118, which provide information describing a location of the user device 102. In some cases, the location information provided by the location sensor device(s) 118 may include geolocation information describing a geographic location of the user device 102. For example, the location sensor device(s) 118 may include a GPS device, which provides a location of the user device 102 described in altitude, latitude, and longitude, or some other coordinate system. In some implementations the location sensor device(s) 118 may also include an altimeter or barometer that provides atmospheric pressure data or altitude data describing an altitude of the user device 102. In some cases, the location sensor device(s) 118 may also include a gravimeter measuring the strength of a gravity field at the user device 102. Such gravity measurements may indicate an altitude or a geographic location of the user device 102, given the measurable variations of the Earth's gravitational field based on geographic location and distance from the Earth's center. The location of the user device 102 may be described in terms of any coordinate system, including but not limited to latitude and longitude. The location of the user device 102 may also be described as being in or near a geographic feature, such as a country, state, province, prefecture, city, county, parish, town, neighborhood, borough, street, or building.

The location sensor device(s) 118 may also include one or more network transceivers that determine a location of the user device 102 based on the presence or strength of one or more signals for networks such as local area networks (LANs), wide area networks (WANs), wireless WANs (WWANs), wireless LANs (WLANs), and mobile communications networks (e.g. 3G, 4G, and so forth). In some implementations, the location information may also describe the location of the user device 102 relative to other objects. For example, the location sensor device(s) 118 may include a sonic transceiver or echo-location device that employs sound or ultrasound to determine a location of the user device 102 relative to other objects in proximity to the user device 102. In some cases, the location sensor device(s) 118 may also provide information regarding the velocity or acceleration of the user device 102, by tracking a movement of the user device 102 between multiple locations over a measured period of time.

The sensor device(s) 106 may include one or more orientation sensor devices 120. The orientation sensor device(s) 120 may include accelerometers, gyroscopic sensor devices, compasses, magnetometers, or other devices that provide orientation data describing a spatial orientation of the user device 102 relative to one or more directions. For example, the orientation data may describe a yaw, a pitch, or a roll of the device, or any other angle at which the user device 102 is situated in space. The orientation data may indicate an angle at which the user device 102 is being held by the user 104, or an angle at which the user device 102 is resting on another object. In some cases, the orientation data may indicate a stance of the user 104 holding the user device 102, such as whether the user 104 is sitting, standing, laying, walking, running, and so forth. Implementations may support user device(s) 102 including other types of sensor device(s) 106, in addition to or instead of the example sensor device(s) 106 described herein.

The sensor device(s) 106 may include one or more proximity sensor devices 122, which measure a distance from the user device 102 to one or more body parts of the user 104. The proximity sensor device(s) 122 may include one or more capacitive sensor devices that measure the distance from the user 104 to the user device 102 based on variations in an electromagnetic signal. The proximity sensor device(s) 122 may also include one or more IR sensors that detect IR-frequency light emitted or reflected by one or more body parts of the user 104.

The user device(s) 102 may send the sensor data 108 to one or more analysis server devices 124. The analysis server device(s) 124 may be any type of computing device, including but not limited to a desktop computer, a mainframe computer, a server computer, a network computer, a cloud computing device, and so forth. An example of the analysis server device(s) 124 is described further with reference to FIG. 3.

The analysis server device(s) 124 may include a characteristic analysis module 126, which executes on the analysis server device(s) 124 to analyze the sensor data 108 received from the user device(s) 102 and generate user characteristic data 128.

The user characteristic data 128 may include estimates for any number of user characteristics of any number of users 104. The user characteristic data 128 may include any type of data describing physical characteristics or dimensions of the user(s) 104, including a height, a weight, a width, a gender, or an age of one or more users 104. The user characteristic data 128 may also describe dimensions of body parts of the user(s) 104, such as arm length, leg length, finger length, mouth width, eye separation, waist width or circumference, foot size, and so forth. In some cases, the user characteristic data 128 may include clothing or apparel sizes for the user 104, including but not limited to pant size (waist or inseam size), dress size, shirt size (chest size, shoulder width, or arm length), coat size, hat size, ring size, watch size, shoe size, and so forth.

In some implementations, the characteristic analysis module 126 may process the sensor data 108 received from multiple sensor devices 106 to determine a processed estimate of one or more user characteristics of the user(s) 104. The sensor data 108 and the processed estimates of user characteristics may be stored in memory on the analysis server device(s) 124 or elsewhere. On receiving subsequent sensor data 108 regarding the user(s) 104, the characteristic analysis module 126 may re-process, refine, or otherwise update its estimates of the user characteristic(s) for the user(s) 104, and store the updated estimates.

In some implementations, the characteristic analysis module 126 may determine one or more instructions based on the estimated user characteristics 130, and provide the instruction(s) 130 to the user device(s) 102. In some cases, the instruction(s) 130 may be provided to one or more of the user devices 102 that provided the sensor data 108. Alternatively, the instruction(s) 130 may be provided to one or more user devices 102 other than those that provided the sensor data 108. For example, the instruction(s) 130 may identify a particular user 104 as currently using a user device 102, and may instruct the user device 102 to activate particular user interface preferences or other preferences of the user 104. The instruction(s) 130 may also determine whether the user 104 is provided access to one or more features, functions, or applications on the user device 102.

In some implementations, the characteristic analysis module 126 may determine content based on the estimated user characteristic(s) 132. For example, the content 132 may include one or more particular web pages previously identified by the user 104 as a home page or favorite pages, and such content 132 may be displayed in a web browser for the user 104. In some cases, the content 132 may include one or more listings of products available on an e-commerce web site, and the products listed may be customized for the user 104 based on his or her user characteristics. For example, the user 104 may be browsing for shoes on a web site, and the presented content 132 may include those shoes with a size that is suitable for the user 104 based on the user's estimated shoe size.

In some cases, the sensor data 108 may include data generated by external sensor device(s) 134 that are not incorporated into the user device(s) 102. The external sensor device(s) 134 may include one or more image capture devices (e.g., cameras), acoustic sensor devices, motion sensor devices, any of the other device types included in the sensor device(s) 106, or other devices. The external sensor device(s) 134 may be situated in proximity to one or more of the user(s) 104, and configured to generate sensor data 108 describing the user(s) 104 or their activities. In some cases, the external sensor device(s) 134 may be fixed or substantially stationary, located in an environment frequented by the user 104 (e.g., the user's home, workplace, and so forth). The sensor data 108 generated by the external sensor device(s) 134 may be sent to the analysis server device(s) 124 over a network, and employed to estimate user characteristics.

In addition to or instead of being performed on the analysis server device(s) 124, some or all of the operations of the characteristic analysis module 126 may be performed on the user device(s) 102, or on other devices that are external to the analysis server device(s) 124. The various operations of the characteristic analysis module 126 are described further with reference to FIGS. 6-14.

In some implementations, the devices of the environment 100 may communicate with other devices using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth).

The various devices of the environment 100 may use any communications protocol or standard to communicate with one another, or with other devices not shown in FIG. 1. The information may be sent using one or more protocols at any level of the Open Systems Interconnection (OSI) networking module. For example, information may be sent using a transport layer protocol such as any version of the Transmission Control Protocol (TCP) or the User Datagram Protocol (UDP). The information may also be sent using an internet layer protocol such as any version of the Internet Protocol (IP). The information may also be sent using an application layer protocol such as the Hypertext Transfer Protocol (HTTP), the HTTP Secure (HTTPS), the File Transfer Protocol (FTP), and so forth. In some implementations, the communications between the various devices of the environment 100 may be encrypted or otherwise secure. For example, the communications may be encrypted using any version of the Secure Sockets Layer (SSL) protocol or the Transport Layer Security (TLS) protocol.

Figure 2:
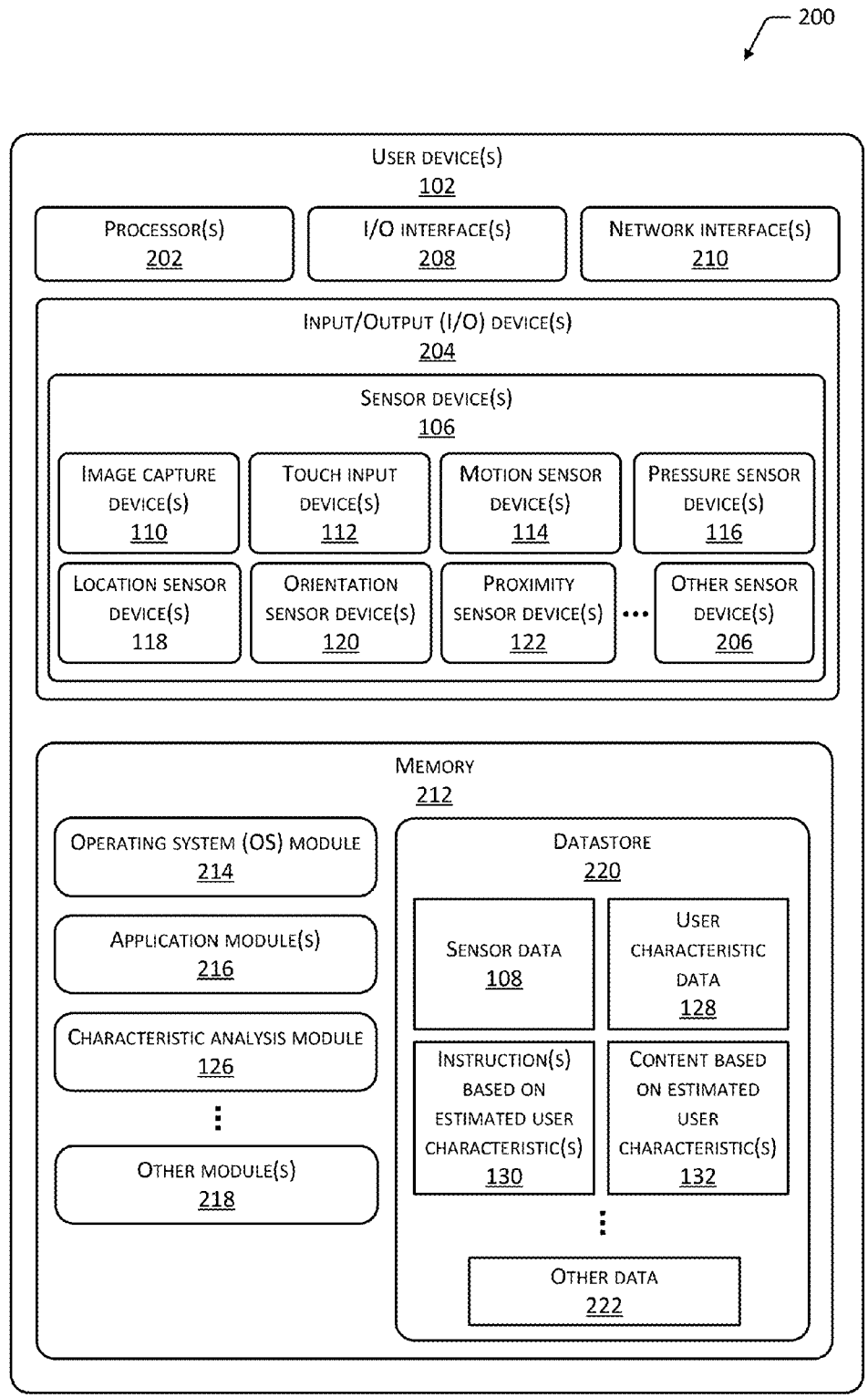
FIG. 2 depicts a block diagram of a user device configured to perform operations for gathering and sending sensor data regarding the user.

FIG. 2 depicts a block diagram 200 of an example user device 102 configured to perform operations for gathering and sending the sensor data 108 regarding one or more users 104. The user device(s) 102 may include one or more processors 202 configured to execute one or more stored instructions. The processor(s) 202 may comprise one or more cores.

The user device(s) 102 may include one or more input/output (I/O) devices 204. The I/O device(s) 204 may include user input devices such as a keyboard, a mouse, a pen, a game controller, a voice input device, a haptic input device, or other devices. The I/O device(s) 204 may also include the one or more sensor devices 106, such as the image capture device(s) 110, the touch input device(s) 112, the motion sensor device(s) 114, the pressure sensor device(s) 116, the location sensor device(s) 118, the orientation sensor device(s) 120, the proximity sensor device(s) 122, or one or more other sensor devices 206. The I/O device(s) 204 may also include output devices such as a display, a printer, audio speakers, haptic output devices, and so forth. The I/O device(s) 204 may be physically incorporated with the user device(s) 102, or may be externally placed.

The user device(s) 102 may include one or more I/O interfaces 208 to enable components of the user device(s) 102 to control, interface with, or otherwise communicate with the I/O device(s) 204. The I/O interface(s) 208 may enable information to be transferred in or out of the user device(s) 102, or between components of the user device(s) 102, through serial communication, parallel communication, or other types of communication. For example, the I/O interface(s) 208 may comply with the RS-232 standard for serial ports, or with the Institute of Electrical and Electronics Engineers (IEEE) 1284 standard for parallel ports. As another example, the I/O interface(s) 208 may be configured to provide a Universal Serial Bus (USB) connection. The user device(s) 102 may also include one or more busses or other internal communications hardware or software that allow for the transfer of data between the various modules and components of the user device(s) 102.

The user device(s) 102 may include one or more network interfaces 210 to enable communications between the user device(s) 102 and other networked devices, such as the analysis server device(s) 124 and the external sensor device(s) 134. The network interface(s) 210 may include one or more network interface controllers (NICs) or other types of transceiver devices configured to send and receive communications over a network.

The user device(s) 102 may include one or more memories, described herein as memory 212. The memory 212 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 212 provides storage of computer-readable instructions, data structures, program modules, and other data for the operation of the user device(s) 102.

The memory 212 may include an operating system (OS) module 214. The OS module 214 is configured to manage hardware resources such as the I/O device(s) 204, the I/O interface(s) 208, and the network interface(s) 210, and to provide various services to applications, processes, or modules executing on the processor(s) 202. The OS module 214 may include one or more of the following: any version of the Linux® operating system originally released by Linus Torvalds; any version of iOS® from Apple® Corp. of Cupertino, Calif.; any version of Windows® or Windows Mobile® from Microsoft® Corp. of Redmond, Wash.; any version of Android® from Google®, Corp. of Mountain View, Calif. and its derivatives from various sources; any version of Palm OS® from Palm Computing®, Inc. of Sunnyvale, Calif. and its derivatives from various sources; any version of BlackBerry OS® from Research In Motion® Ltd. of Waterloo, Ontario, Canada; any version of VxWorks® from Wind River® Systems of Alameda, Calif.; or other operating systems.

In some implementations, the memory 212 includes one or more application modules 216. The application module(s) 216 may include any type of user application that may be employed to the user 104, including but not limited to web browsers, word processing or data processing applications, social networking application, messaging applications, e-mail applications, chat applications, games, media players, and so forth.

In some implementations, the user device(s) 102 may perform some or all of the processing operations to analyze the sensor data 108 and estimate user characteristics. In such implementations, the memory 212 may include at least a portion of the characteristic analysis module 126. The memory 212 may also include one or more other modules 218, such as user authentication or identification modules, security modules, user preference or settings modules, and so forth.

The memory 212 may also include a datastore 220 to store information for operations of the user device(s) 102. The datastore 220 may comprise a database, array, structured list, tree, or other data structure. The datastore 220 may include the sensor data 108, the user characteristic data 128, the instruction(s) based on estimated user characteristic(s) 130, or the content based on estimated user characteristic(s) 132.

The datastore 220 may also include other data 222, such as user account information, user authentication information, and so forth. In some implementations, at least a portion of the information stored in the datastore 220 may be stored externally to the user device(s) 102, on other devices that are accessible to the user device(s) 102 over a network.

Figure 3:
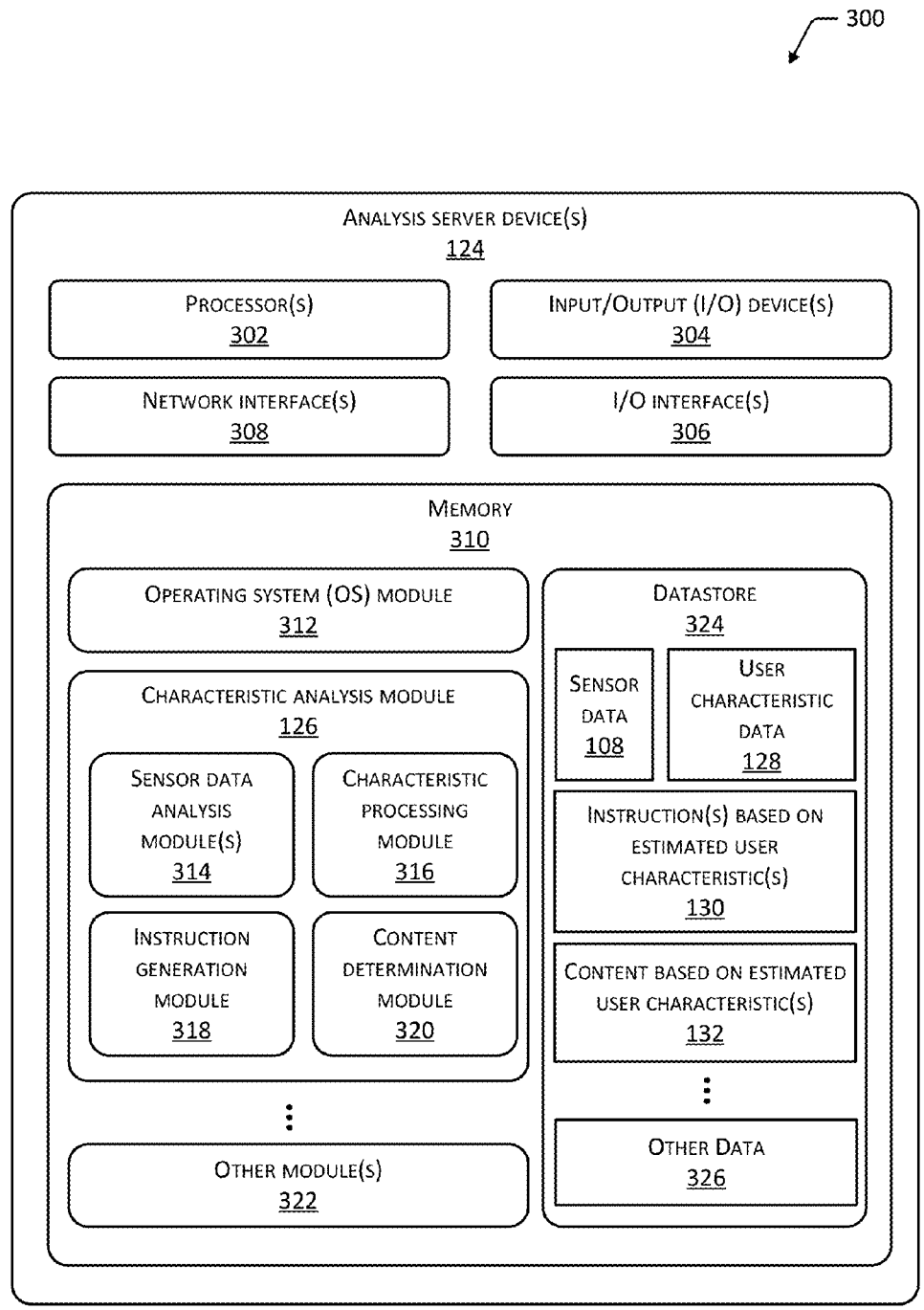
FIG. 3 depicts a block diagram of an analysis server device configured to analyze sensor data, estimate user characteristic(s) based on the sensor data, process the plurality of estimates to determine a processed estimate, and perform one or more actions based on the processed estimate.

FIG. 3 depicts a block diagram 300 of an example analysis server device 124 configured to analyze the sensor data 108, estimate user characteristic(s) of the user(s) 104 based on the sensor data 108, process a plurality of estimates, and perform one or more actions based on the processed estimates. The analysis server device(s) 124 may include one or more processors 302 configured to execute one or more stored instructions. The processor(s) 302 may comprise one or more cores.

The analysis server device(s) 124 may include one or more input/output (I/O) devices 304. The I/O device(s) 304 may include user input devices such as a keyboard, a mouse, a pen, a game controller, a voice input device, a touch input device, a gestural input device, a haptic input device, or other devices. The I/O device(s) 304 may also include output devices such as a display, a printer, audio speakers, haptic output devices, and so forth. The I/O device(s) 304 may be physically incorporated with the analysis server device(s) 124, or may be externally placed.

The analysis server device(s) 124 may include one or more I/O interfaces 306 to enable components of the analysis server device(s) 124 to control, interface with, or otherwise communicate with the I/O device(s) 304. The I/O interface(s) 306 may enable information to be transferred in or out of the analysis server device(s) 124, or between components of the analysis server device(s) 124, through serial communication, parallel communication, or other types of communication. For example, the I/O interface(s) 306 may comply with the RS-232 standard for serial ports, or with the Institute of Electrical and Electronics Engineers (IEEE) 1284 standard for parallel ports. As another example, the I/O interface(s) 306 may be configured to provide a Universal Serial Bus (USB) connection. The analysis server device(s) 124 may also include one or more busses or other internal communications hardware or software that allow for the transfer of data between the various modules and components of the analysis server device(s) 124.

The analysis server device(s) 124 may include one or more network interfaces 308 to enable communications between the analysis server device(s) 124 and other networked devices, such as the user device(s) 102 or the external sensor device(s) 134. The network interface(s) 308 may include one or more network interface controllers (NICs) or other types of transceiver devices configured to send and receive communications over a network.

The analysis server device(s) 124 may include one or more memories, described herein as memory 310. The memory 310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the analysis server device(s) 124.

The memory 310 may include an OS module 312. The OS module 312 may be configured to manage hardware resources such as the I/O device(s) 304, the I/O interface(s) 306, and the network interface(s) 308, and to provide various services to applications, processes, or modules executing on the processor(s) 302. The OS module 312 may include one or more of the operating systems described above with regard to OS module 214.

In some implementations, the memory 310 includes the characteristic analysis module 126, configured to analyze the sensor data 108 and generate the user characteristic data 128 describing one or more user characteristics for the user(s) 104. In some cases, the characteristic analysis module 126 may include one or more sensor data analysis modules 314 that are configured to receive, interpret, and analyze the particular types of sensor data 108 received from the sensor device(s) 106 and the external sensor device(s) 134.

The characteristic analysis module 126 may also include a characteristic processing module 316, configured to perform mathematical, statistical, or other operations to process multiple estimates for the user characteristic(s) and determine a processed estimate of user characteristic(s). In some cases, the characteristic processing module 316 may determine a processed estimate for one or more user characteristics by correlating, combining, or otherwise processing multiple estimates that are based on different types of the sensor data 108. The characteristic processing module 316 may also provide a margin of error, uncertainty, variance, or other statistical measure of the confidence of the processed estimate. For example, based on combining a height estimate determined from image data and a height estimate determined from motion data, the characteristic processing module 316 may estimate that a user 104 has a height of 1.8 meters, with a margin of error of 0.1 meters.

In some implementations, the characteristic analysis module 126 may include an instruction generation module 318 that is configured to generate one or more of the instructions based on estimated user characteristic(s) 130. The characteristic analysis module 126 may also include a content determination module 320 that is configured to determine the content based on estimated user characteristic(s) 132. Operations of the characteristic analysis module 126 are described further with reference to FIGS. 6-14. The memory 310 may also include one or more other modules 322, such as a user authentication module, an access control module, and so forth.

The memory 310 may also include a datastore 324 to store information for operations of the analysis server device(s) 124. The datastore 324 may comprise a database, array, structured list, tree, or other data structure. The datastore 324 may include the sensor data 108, the user characteristic data 128, the instruction(s) based on estimated user characteristic(s) 130, or the content based on estimated user characteristic(s) 132.

The datastore 324 may also store other data 326, such as user account information, user authentication information, and so forth. In some implementations, at least a portion of the information stored in the datastore 324 may be stored externally to the analysis server device(s) 124, on other devices that are accessible to the analysis server device(s) 124 over a network.

Figure 4:
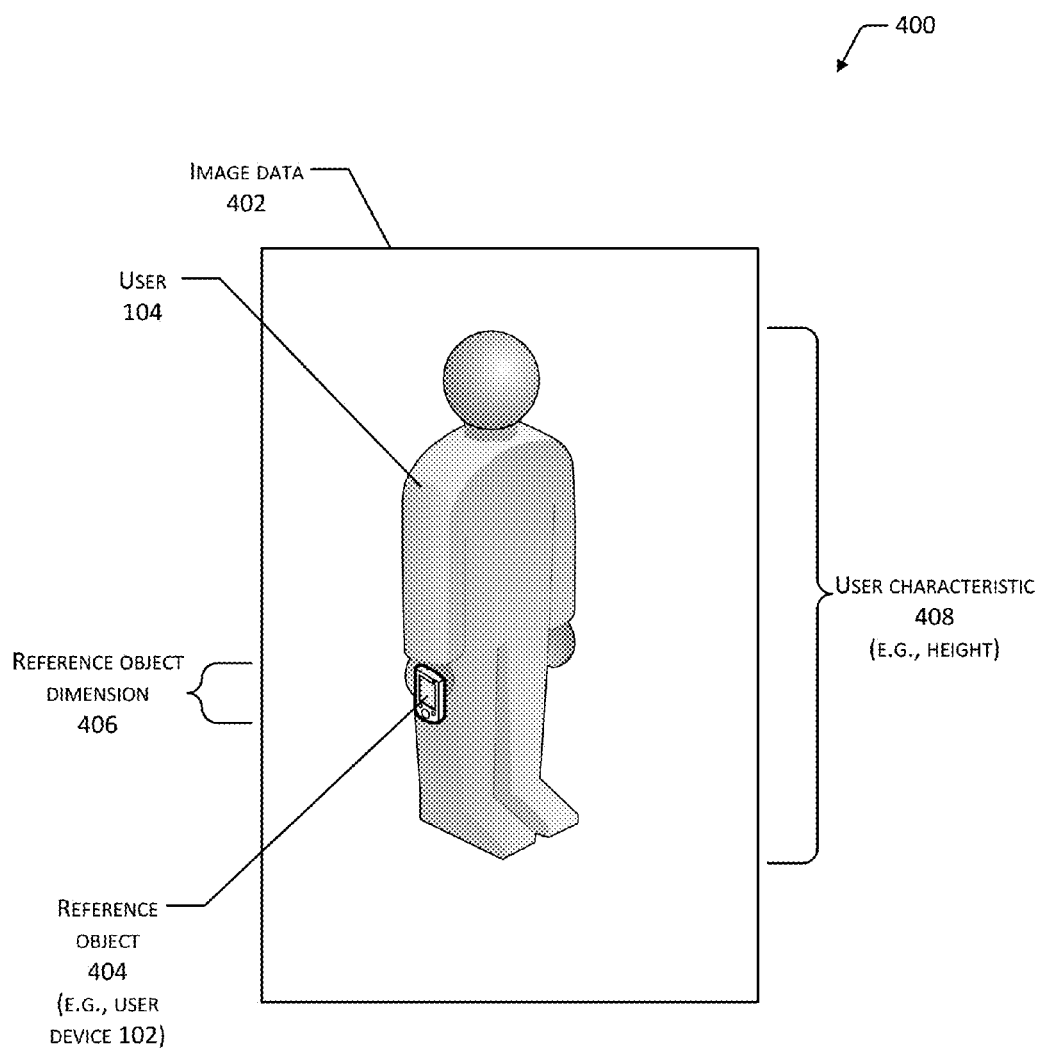
FIG. 4 illustrates implementations in which a user characteristic, such as the user's height or other physical dimension, is estimated based on comparing the relative sizes of the user and a reference object in an image.

FIG. 4 depicts a schematic 400 illustrating implementations in which a user characteristic, such as a height or other physical dimension of the user 104, is estimated based on comparing the relative sizes of at least a part of the user 104 and a reference object in an image. In this example, the sensor data 108 includes image data 402. The image data 402 may be generated by one or more image capture device(s) 110, one or more other sensor device(s) 206, or the external sensor device(s) 134, and received for analysis by the characteristic analysis module 126 executing on either or both of the user device(s) 102 and the analysis server device(s) 124.

The image data 402 may include an image of at least a portion of the user 104. The image data 402 may also include an image of at least a portion of a reference object 404. In some cases, the reference object 404 may be the user device 102. The reference object 404 may also be any other object of at least one known dimension, such as a credit card or bank card. In some implementations, the image data 402 may be analyzed to recognize the reference object 404 based on its size, color, design, or other aspects of its appearance. Information describing a known size of at least one reference object dimension 406 (e.g., a length, width, or height) of the reference object 404 may be available, and that information may be retrieved from data storage on the analysis server device(s) 124 or elsewhere. In some cases, such as when the reference object 404 is the user device 102, the user device 102 may store information regarding the reference object dimension 406, and may provide that information to the characteristic analysis module 126.

The image data 402 may be analyzed to determine a relative or proportional size of the reference object dimension 406 and a user characteristic 408 as shown in the image data 402. The actual size of the user characteristic 408 may then be calculated, based on the known size of the reference object dimension 406 and the proportion of the reference object dimension 406 to the user characteristic 408 shown in the image data 402. For example, the analysis of the image data 402 may determine that the height of the user 104 is shown in the image as being eighteen times larger than the reference object dimension 406. If the actual reference object dimension 406 is 10 centimeters, then the height of the user 104 may be estimated to be 180 centimeters, or 1.8 meters. Image-based estimation of user characteristics is described further with reference to FIG. 7.

Figure 5:
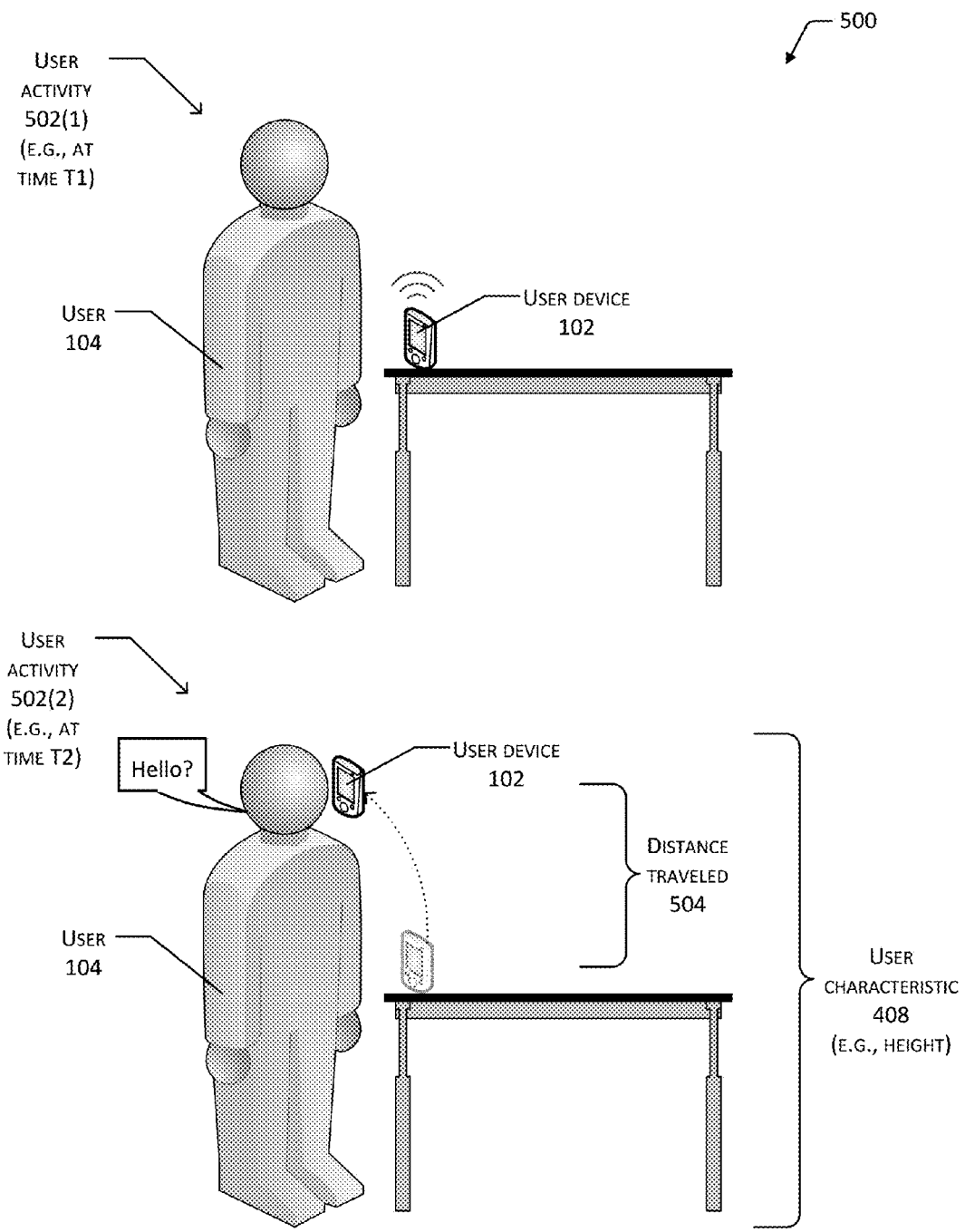
FIG. 5 illustrates implementations in which a user characteristic, such as the user's height or other physical dimension, is estimated based on a distance traveled by the user device during a particular activity of the user, such as participating in a phone call.

FIG. 5 depicts a schematic 500 illustrating implementations in which a user characteristic, such as a height or other physical dimension of the user 104, is estimated based on a distance traveled by the user device 102 during a particular user activity 502 of the user 104. In the example of FIG. 5, the user activity 502 is the user 104 participating in a telephone call on the user device 102. Implementations also support other user activities 502, such as responding to a text message, reading a book, web page, or other document, playing a game, watching a video, and so forth.

At a time T1, the user 104 may engage is a first phase of the user activity 502(1). In this example, an indication of a telephone call is received at the user device 102 at time T1. At a time T2, the user 104 may engage in a second phase of the user activity 502(2) by picking up the user device 102, and placing it to his or her ear to participate in the telephone call. In some cases, the second phase of the user activity 502(2) may be indicated by accelerometer data indicating that the user device 102 has substantially stopped moving, by gyroscopic data indicating a particular orientation of the user device 102, by proximity data indicating that the distance between the user 104 and the user device 102 is no longer changing, or by any combination of these or other types of the sensor data 108.

Implementations may employ accelerometer data, atmospheric pressure data, proximity data, or other sensor data 108 from the sensor device(s) 106 to determine a distance traveled 504 by the user device 102 from its initial resting surface (e.g., a table top) to the user's ear. In some cases, the distance traveled 504 may be estimated using motion data, by integrating the velocity or the acceleration of the user device 102 over a measured time period from a beginning to the end of the movement of the user device 102. In some implementations, the distance traveled 504 may also be based on atmospheric pressure data describing a change in the altitude of the user device 102 while the telephone call is being answered or otherwise initiated. In some cases, the distance traveled 504 may be determined as a difference between the distances from the user device 102 to the user 104 at the two times T1 and T2, as indicated by the proximity data. In some implementations, independent estimates of the distance traveled 504 may be made based on two or more of the motion data, the proximity data, and the atmospheric pressure data, and the estimates may be correlated, combined, or otherwise processed to provide a potentially more accurate estimate of the distance traveled 504.

Based on the estimate of the distance traveled 504, an estimate may be determined for the user characteristic 408, such as the height of the user 104. In some cases, this estimate may be based on an assumption that the user device 102 was initially resting at a particular height relative to the user 104 (e.g., at approximately waist height on a table top. The estimate may also be based on data that describes an average distance from a user's ear to the top of the user's head. Estimation of user characteristics based on movement of the user device 102 is described further with reference to FIG. 8.

Figure 6:
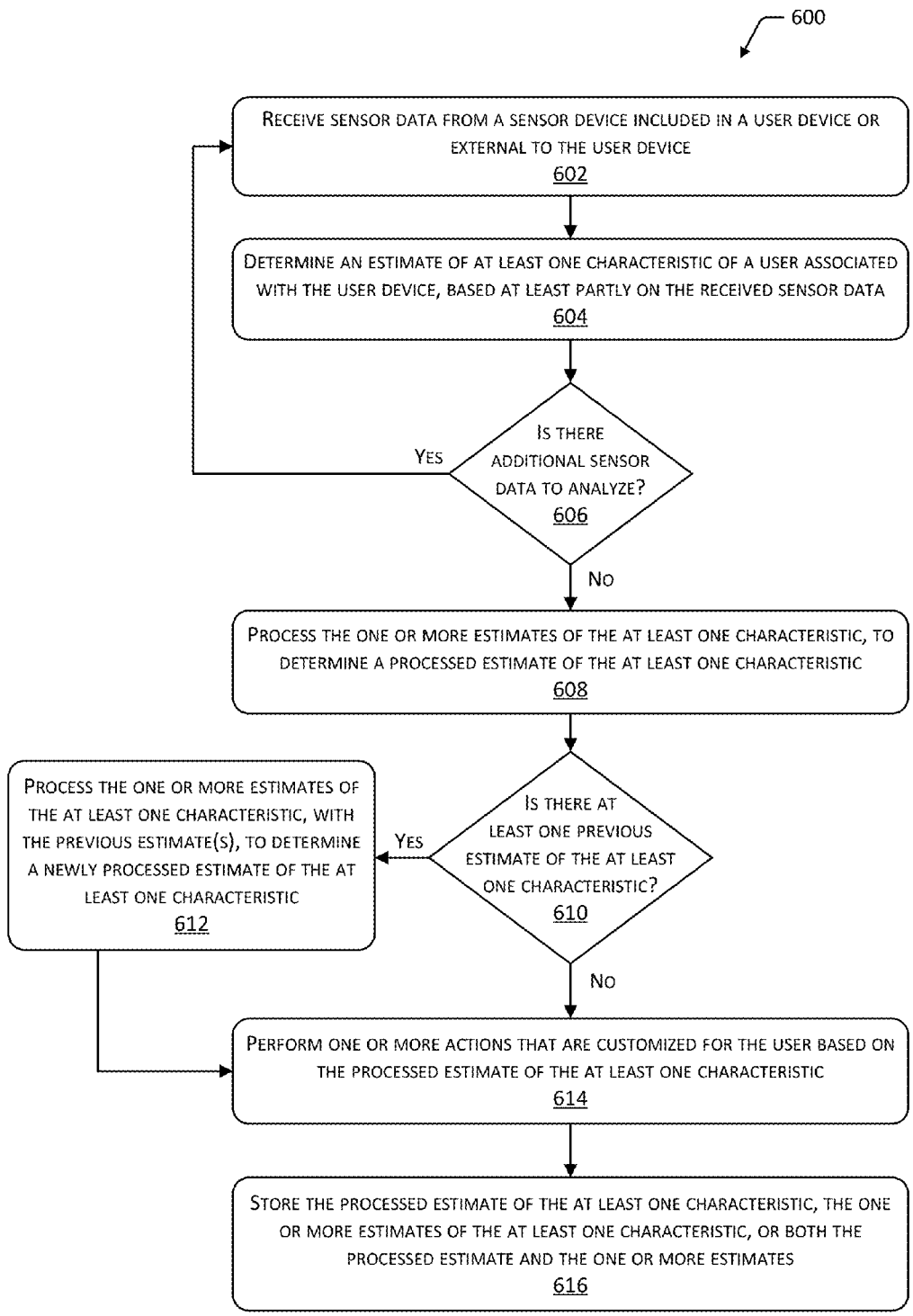
FIG. 6 depicts a flow diagram of a process for analyzing received sensor data from one or more sensor devices, estimating at least one user characteristic based on each set of sensor data, processing the estimates of the user characteristic(s) to determine one or more processed estimated=s, and performing one or more actions based on the processed estimate(s) of the user characteristic(s).

FIG. 6 depicts a flow diagram 600 of a process for receiving the sensor data 108, estimating at least one user characteristic based on the sensor data 108, processing the multiple estimates of the user characteristic(s), and performing one or more actions based on the processed estimates of the user characteristic(s). Operations of the process may be performed by the characteristic analysis module 126, the application module(s) 216, or other modules executed by the user device(s) 102, the analysis server device(s) 124, or both the user device(s) 102 and the analysis server device(s) 124.

At 602, the sensor data 108 is received from the sensor device(s) 106, from the external sensor device(s) 134, or from both the sensor device(s) 106 and the external sensor device(s) 134. The sensor data 108 received from the sensor device(s) 106 may be received from a user device 102 that is owned or operated by the user 104 whose user characteristics are to be estimated. Alternatively, the sensor data 108 may be received from another user device 102 that is owned or operated by a different user.

At 604, a determination is made of an estimate for at least one user characteristic of the user 104 associated with the user device 102, based at least partly on the received sensor data 108. Determining estimates for user characteristic(s) is described further with reference to FIGS. 7-10.

Determining an estimate of a user characteristic includes determining a particular value, set of possible values, or range of possible values for the user characteristic. In some cases, the estimate may also include a margin of error, uncertainty, or confidence measure that indicates an accuracy of the estimate. For example, a height of the user may be estimated as 1.8 meters, with a margin of error of 0.1 meters. The margin of error may be a standard deviation that indicates a degree of variation from the estimated value. In this above example, the height estimate of 1.8 meters with a margin of error of 0.1 meters may indicate that the height has a particular probability (e.g., a 95% probability) of being in the range from 1.7 to 1.9 meters. Implementations support estimates and processed estimates of user characteristics to any degree of accuracy, and with any degree of uncertainty.

At 606, a determination is made whether there is additional sensor data 108 to analyze. If so, then the process may return to 602 to receive additional sensor data 108. If not, the process may proceed to 608. In some cases, multiple estimates may be made of a particular user characteristic, with each estimate being made based on a different set of the sensor data 108. For example, a first estimate of the height of the user 104 may be made based on image data as illustrated in FIG. 4, and a second estimate of the height of the user 104 may be made based on motion data, atmospheric pressure data, location data, or other types of sensor data 108 as illustrated in FIG. 5. Operations to determine multiple estimates of the user characteristic may be performed in parallel (e.g., at least partly concurrently), or serially.

At 608, multiple estimates of a user characteristic of the user 104 may be processed to determine a processed estimate of the user characteristic. Processing multiple estimates to generate a processed estimate may include mathematically, statistically, or heuristically combining or correlating the multiple estimates. In some implementations, a margin of error, uncertainty, or confidence measure may also be calculated for the processed estimate, to indicate an accuracy or confidence level of the processed estimate of the user characteristic.

In some implementations, the processing of multiple estimates may include a statistical or mathematical combination of a plurality of estimates of the user characteristic, such as a calculated average of the multiple estimates. The average may be a weighted average, with different types of sensor data 108 given different weights in the average. For example, a height estimate based on image data may be weighted more heavily than a height estimate based on motion data or atmospheric pressure data. In some cases, the sensor data 108 may be associated with a confidence level or margin of error, and the various estimates may be weighted based on the received confidence level or margin of error of the sensor data 108 from which the estimates were determined. In some implementations, estimates based on more recent sensor data 108 may be weighted more heavily than estimates based on older sensor data 108. Implementations support other mathematical, statistical, or heuristic methods to combine multiple estimated to generate a processed estimate. For example, the processed estimate may be determined based on other combinations of multiple estimates, such as a median, a mode, or a mean of multiple estimates.

At 610, a determination is made whether there is at least one previous estimate of the characteristic stored in memory on the analysis server device(s) 124, on the user device(s) 102, or elsewhere. If so, then at 612 the previous estimate(s) may be processed with the current estimate determined at 608, to further refine or revise the estimate(s) and determine a newly processed estimate of the user characteristic. The processing of previous estimate(s) with a current estimate may proceed similarly as the processing of multiple estimates described above with reference to 608. In this way, implementations may enable sensor data 108 employed to refine or revise the processed estimate over time, and enable a more accurate estimate of the user characteristic. If it is determined at 610 that there is no previous estimate of the user characteristic, the process may proceed to 614.

At 614, one or more actions may be performed, the action(s) being customized for the user 104 or for the user device 102 based on the processed estimate of the at least one user characteristic. Such actions are described further with reference to FIGS. 11-14.

At 616, the processed estimate of the at least one user characteristic may be stored in memory on the user device(s) 102, on the analysis server device(s) 124, or elsewhere. In some cases, the processed estimate may be stored in multiple locations, on multiple devices. The processed estimate may be associated with the user 104, such that the processed estimate may be employed to determine subsequent customized actions to perform with regard to the user 104. In some implementations, the processed estimate may be refined or revised over time based on subsequently received sensor data 108 as described above.

Figure 7:
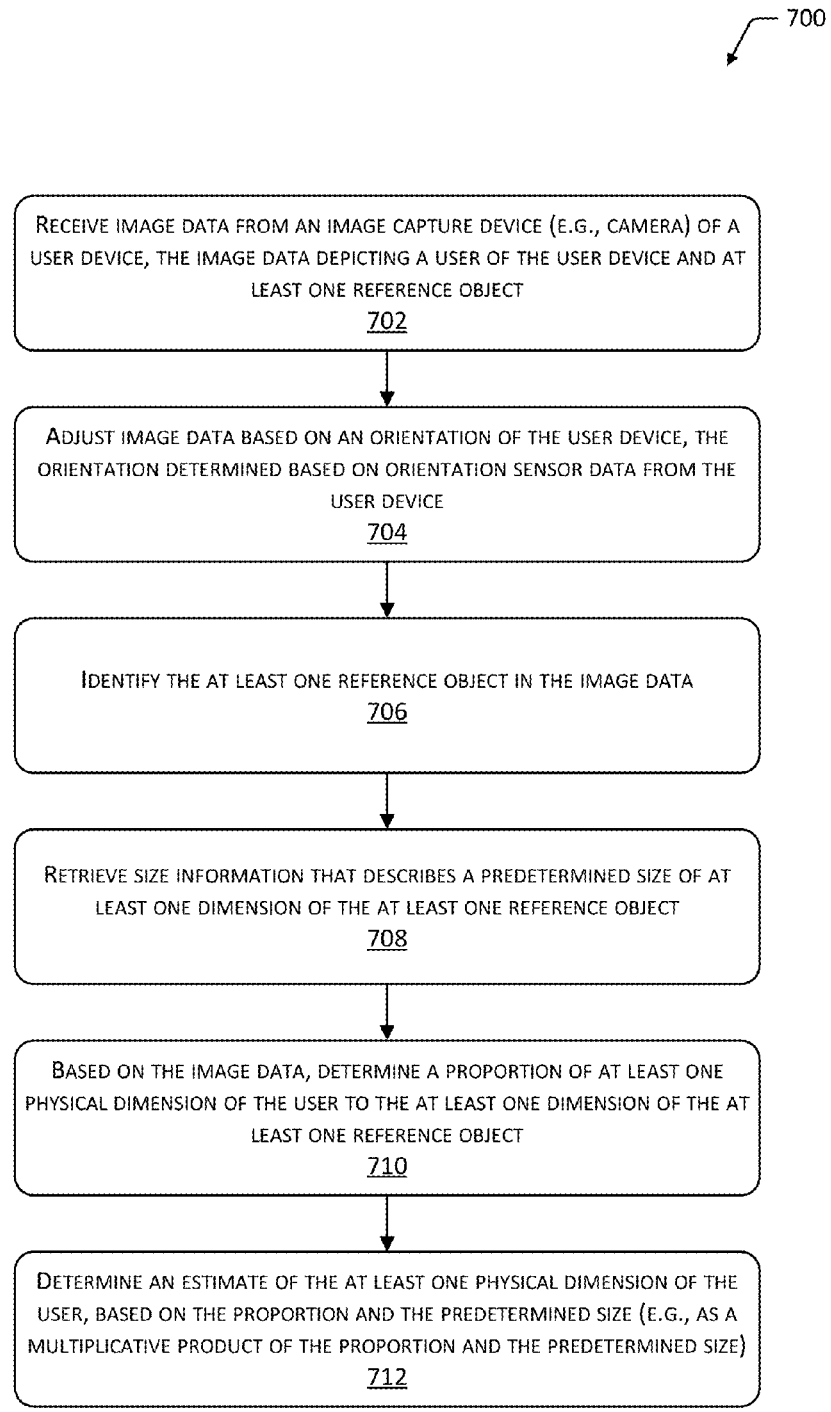
FIG. 7 depicts a flow diagram of a process for determining one or more user characteristics (e.g., physical dimensions of the user) based on the relative sizes of the user and at least one reference object in an image.

FIG. 7 depicts a flow diagram 700 of a process for determining user characteristic(s) such as physical dimension(s) of the user 104 based on the relative sizes of the user 104 and at least one reference object 404 in an image. Operations of the process may be performed by the characteristic analysis module 126, the application module(s) 216, or other modules executed by the user device(s) 102, the analysis server device(s) 124, or both the user device(s) 102 and the analysis server device(s) 124.

At 702, image data 402 may be received from an image capture device 110 of one of the user devices 102, or from an external sensor device 134. In some cases, the image data 402 may be received from a user device 102 that is owned or operated by the user 104 for whom a user characteristic is to be estimated. Alternatively, the image data 402 may be received from a user device 102 that is owned or operated by a user other than the user 104. As described above with reference to FIG. 4, the image data 402 may show an image of at least a portion of the user 104 of the user device 102. The image data 402 may also show an image of at least a portion of at least one reference object 404.

At 704, the image data 402 may be adjusted or otherwise calibrated based on additional sensor data 108. In some implementations, the image data 402 may be adjusted based on an orientation of the user device 102. The orientation of the user device 102 may be determined based on orientation data measured by an orientation sensor device 120 (e.g., a gyroscopic sensor device) of the user device 102. The orientation data may be used to substantially adjust the image data 402 in circumstances where the image capture device 110 captures the image data 402 while the user device 102 is not pointed directly at the user 104 and the reference object(s) 404. Adjusting the image data 402 to simulate a more orthogonal view of the scene may enable a more accurate determination of the relative sizes of the user 104 and the reference object(s) 404, or a more accurate identification of the reference object(s) 404.

At 706, the reference object(s) 404 may be identified through an analysis of the image data 402. In some implementations, the reference object(s) 404 may be identified using image-based object-recognition techniques. Alternatively, the reference object(s) 404 may be identified based on additional sensor data 108. For example, in cases where the reference object 404 is a device that sends a signal, the reference object 404 may be identified based on additional sensor data 108 describing a presence or strength of the signal. Moreover, in some implementations, the reference object(s) 404 may be identified based on user data previously collected regarding the user 104. For example, transaction data may indicate that the user 104 previously purchased a pair of shoes, or was given a pair of shoes as a gift. In such cases, reference object 404 may be recognized as the shoes previously received by the user 104.

At 708, information may be retrieved describing one or more sizes or dimensions of the reference object(s) 404. In some implementations, the size information may be retrieved from storage on the analysis server device(s) 124, the user device(s) 102, or on other devices.

At 710, a determination is made of the proportion of the size of the reference object(s) 404 as shown in the image data 402, to at least one physical dimension of the user 104 as shown in the image data 402. For example, the reference object 404 may be a hat that the user 104 is wearing in the image, and an analysis of the image may determine that the height of the user 104 is 8 times larger than the width of the widest portion of the hat.

At 712, an estimate of the at least one physical dimension of the user 104 is determined, based on the proportion determined at 710 and based on the known size information for the reference object(s) 404 retrieved at 708. For example, the reference object 404 may be a hat worn by the user 104 in the image data 402, and the hat may have an actual width of 20 centimeters. If the proportion between the hat width and the user's height is ⅛ as described above, then the height of the user 104 may be calculated to be 160 centimeters.

Although the above example describes estimating a height of the user 104 based on reference object(s) 404 in image data 402, other physical dimensions of the user 104 may be estimated. Moreover, in some cases multiple reference object(s) 404 may be identified in the image data 402, and employed to generate multiple, independent estimates of a physical dimension of the user 104. The multiple, independent estimates may then be processed to determine a processed estimate of the physical dimension, with a determined margin of error. In some cases, a larger number of reference object(s) 404 may enable a more accurate estimate of the physical dimension. In some implementations, multiple physical dimensions of the user 104 may be estimated based on the reference object(s) 404 in the image data 402.

In some implementations, the image data 402 may be analyzed to perform one or more biomorphic estimates of at least one physical dimension of the user 104. For example, the image data 402 including an image of the user's face may be analyzed to determine a distance between the user's eyes, between the user's ears, or between other features of the user 104. Such distances may then be employed to estimate a height or other physical dimensions of the user 104, within a certain margin of error. In some cases, such biomorphic estimates of physical dimensions may be low accuracy, or rough, estimates, and may enable the classification of the user 104 into one of a plurality of body type categories (e.g., small, medium, or large).

In some implementations, the identified reference object(s) 404 in the image data 402 may be employed to estimate a size of one or more unidentified objects in the image data 402, and the estimated size may be employed to identify the unidentified objects. Such implementations are described further with reference to FIG. 14.

Figure 8:
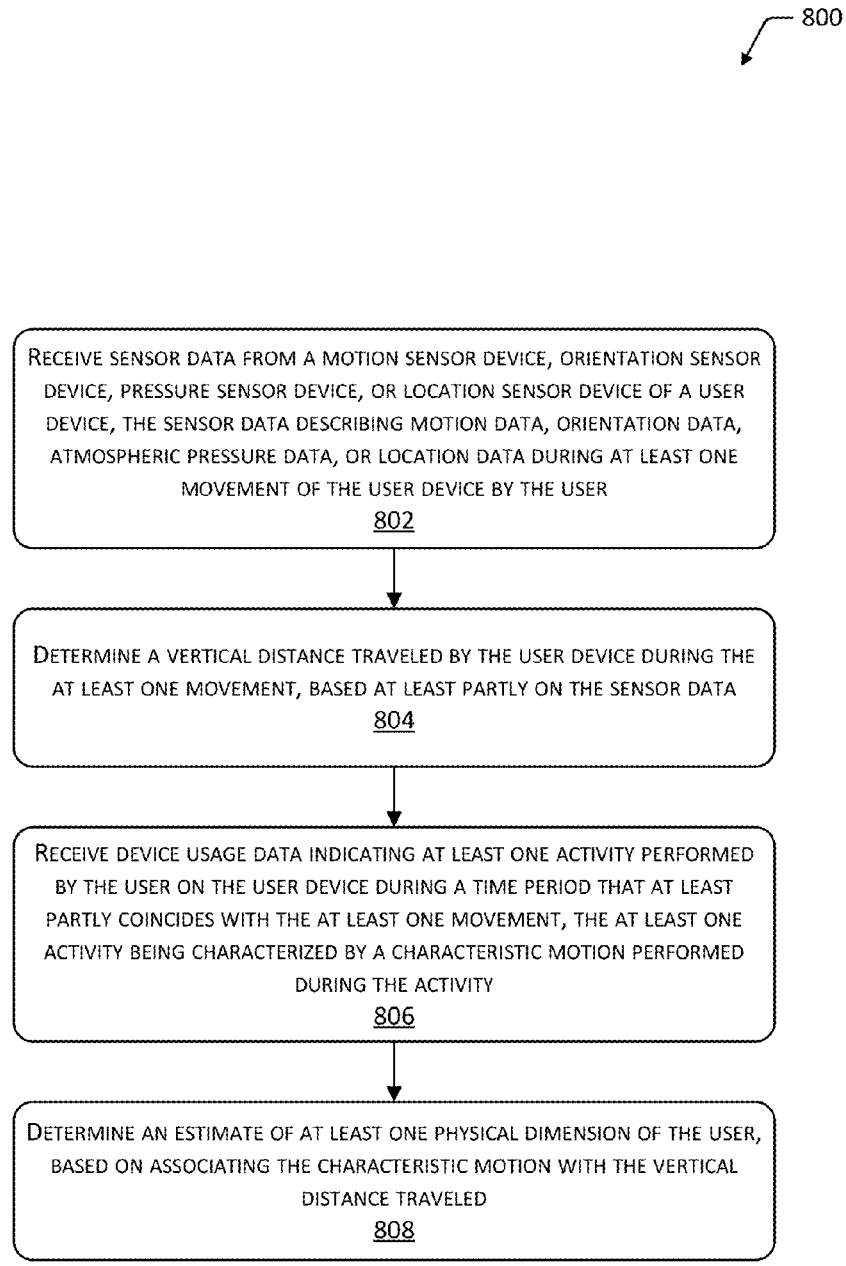
FIG. 8 depicts a flow diagram of a process for using motion sensor data to determine user characteristic(s) based on a distance traveled by a user device during an activity such as the user engaging in a phone call on the user device.

FIG. 8 depicts a flow diagram 800 of a process for using sensor data 108 to determine user characteristic(s) based on a distance traveled by the user device 102 during an activity such as the user participating in a telephone call, as illustrated in FIG. 5. Operations of the process may be performed by the characteristic analysis module 126, the application module(s) 216, or other modules executed by the user device(s) 102, the analysis server device(s) 124, or both the user device(s) 102 and the analysis server device(s) 124.

At 802, the sensor data 108 may be received from one or more sensor devices 106 of the user device(s) 102 or from one or more external sensor device(s) 134. The sensor data 108 may describe one or more movements of the user device 102. The sensor data 108 may include various types of sensor data generated by various sensor devices 106 or external sensor devices 134. For example, the sensor data 108 may include data generated by a motion sensor device 114, a pressure sensor device 116, a location sensor device 118, an orientation sensor device 120, or a proximity sensor device 122.

At 804, an estimate is made of the distance traveled by the user device 102 during the movement of the user device 102, based at least partly on the sensor data 108. Implementations support the estimation of the distance traveled 504 based on various types of sensor data 108. For example, the distance traveled 504 may be based on sensor data 108 received from motion sensor device(s) 114 such as accelerometer(s) and gyroscopic sensor device(s), which measure a velocity or acceleration of the user device 102 over a period of time. The velocity or acceleration data may be integrated over time to determine the distance traveled 504 during that period of time. The distance traveled 504 may include a vertical distance traveled or a vertical component of the distance traveled, such as a change in elevation of the user device 102.

As another example, the distance traveled 504 may be based on sensor data 108 received from pressure sensor device(s) 116 such as an altimeter. In such cases, the distance traveled 504 may be estimated based on a change in altitude that is indicated by a change in the air pressure measured at the user device 102 while it is moving.

The distance traveled 504 may also be based on sensor data 108 received from location sensor device(s) 118 such as a GPS receiver or other type of navigation device. In such cases, the user device 102 may be detected at a first location at a first time, and at a second location at a second time. The distance traveled 504 may be calculated as the distance between the first location and the second location, indicating an altitude change of the user device 102 as it is being lifted to the user's ear. The distance traveled may also be based on a difference in the proximity of the user device 102 to the user 104, as indicated by proximity data measured by the proximity sensor device 122.

At 806, device usage data may be received, indicating at least one activity performed by the user 104 on the user device 102 during a time period that at least partly coincides with the movement of the user device 102. The at least one activity may include any activity during which the user 104 may move the user device 102 in a predictable manner with a motion that is characteristic of the activity. For example, the at least one activity may include engaging in a telephone call, which includes a characteristic motion of the user device 102 from a resting position (e.g., on a table top or other surface) to a location near the user's ear. The at least one activity may also include responding to a text message, which includes a characteristic motion of the user device 102 from a resting position to another position (e.g., in front the user's chest) more suitable for entering text on the user device 102. Other activities may include the user 104 reading a document, a book, or a web page on the user device 102, playing a game, watching video content, using a camera to take a photograph or video capture, and so forth.

At 808, a determination of an estimate of at least one physical dimension of the user 104 may be made based on the distance traveled 504 as determined at 804, and based on the at least one activity indicated by the device usage data received at 806. In some cases, the determination may be based on a vertical component of the distance traveled 504, e.g., a vertical distance, indicating an altitude change of the user device 102 from a first altitude to a second altitude. For example, engaging in a phone call on the user device 102 may include a characteristic motion of the user device 102 from a resting position (e.g., on a table top) to the user's ear. In such cases, it may be inferred that the distance traveled 504 corresponds to the change in altitude from a table top to the user's ear. Based on associating the distance traveled 504 with the characteristic motion of a change in altitude from a table top to the user's ear, the height of the user 104 may be estimated. Such an estimate may also account for an average distance between the ear and the top of the head in a population of persons. Implementations also support the estimation of physical characteristics of the user 104 based on other types of motions performed during other activities.

Figure 9:
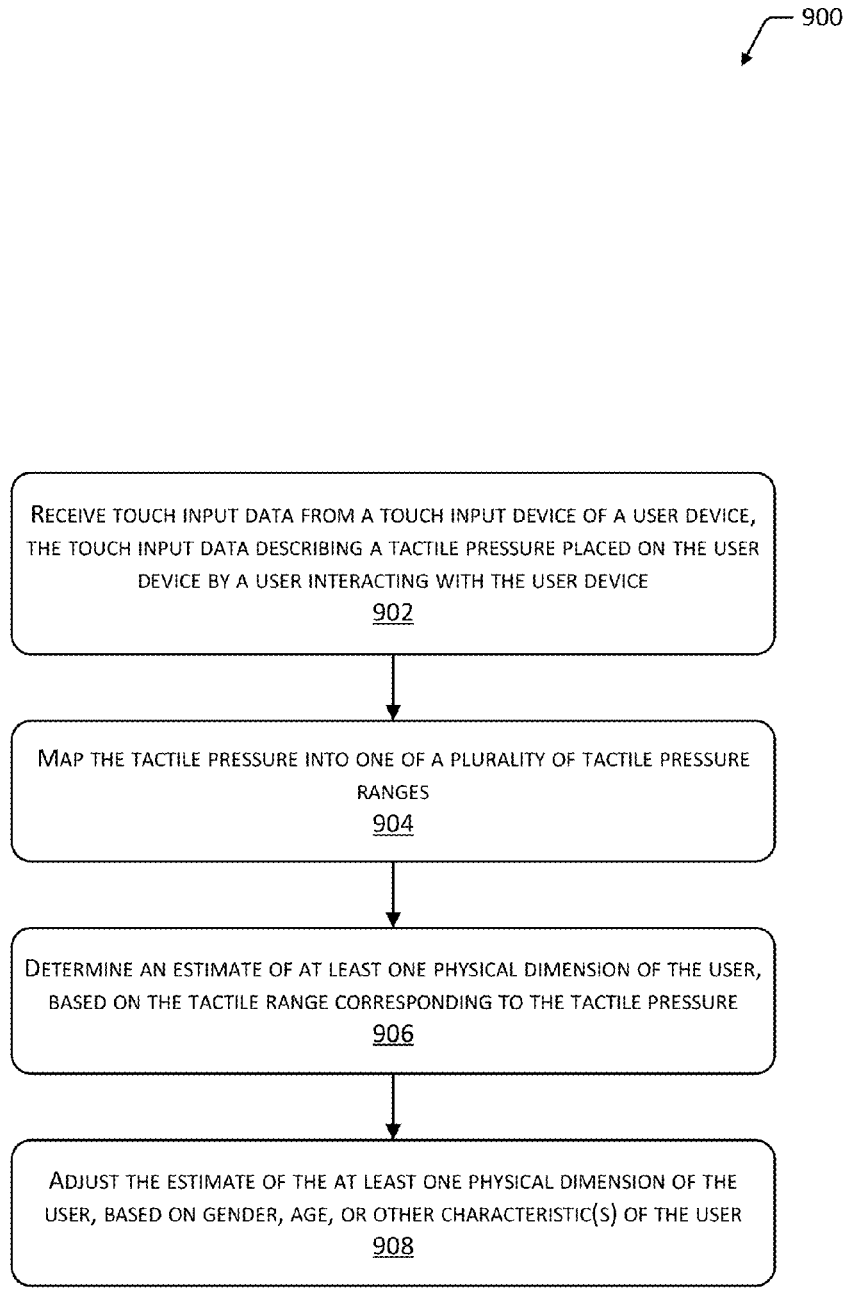
FIG. 9 depicts a flow diagram of a process for using touch input sensor data to determine user characteristic(s) based on a tactile pressure placed by the user on the user device while interacting with the user device.

FIG. 9 depicts a flow diagram 900 of a process for using touch input sensor data to determine user characteristic(s) based on a tactile pressure placed by the user 104 on the user device 102 while interacting with the user device 102. Operations of the process may be performed by the characteristic analysis module 126, the application module(s) 216, or other modules executed by the user device(s) 102, the analysis server device(s) 124, or both the user device(s) 102 and the analysis server device(s) 124.

At 902, sensor data 108 including touch input data is received from a touch input device 112 of the user device 102. In some implementations, the touch input data describes a tactile pressure placed on the touch input device 112, or placed on another component of the user device 102, by the user 104 while he or she is interacting with the user device 102. In some cases, the tactile pressure may be applied by the user 104 while he or she is entering information or commands to a touch input device 112 of the user device 102, such as a touchscreen or a touchpad. Alternatively, the tactile pressure may be applied by the user 104 to one or more external surfaces of the user device 102 while the user 104 is holding the user device 102.

At 904, the tactile pressure indicated by the sensor data 108 may be mapped into one of a plurality of tactile pressure ranges. For example, a range of possible tactile pressures may be divided into a plurality of tactile pressure sub-ranges or buckets. Such sub-ranges may be of equal width (e.g., may span equal sub-ranges of pressure), or may be of unequal width.

At 906, a determination may be made of an estimate for at least one user characteristic of the user 104, based on the tactile sub-range or bucket corresponding to the tactile pressure. In some implementations, each of the sub-ranges may correspond to a range of possible values for a user characteristic. For example, a range of tactile pressures may be divided into three sub-ranges, respectively corresponding to users of small, medium, and large weight, height, or stature. As another example, a range of tactile pressures may be divided into multiple sub-ranges, each corresponding to one or more age ranges of users or corresponding to user gender. Such a mapping of pressure sub-ranges to user characteristic values may be based on previous experiments to determine how much pressure is placed on a user device 102 by users having different characteristics. In this way, implementations may support the user of tactile pressure data to estimate the weight, age, gender, or other physical characteristics of the user 104.

In some implementations, the touch input data may be further analyzed to determine a frequency of touch inputs to the user device 102, or one or more patterns of touch inputs to the user device 102. Such frequency or pattern information may then be employed to estimate one or more user characteristics for the user 104. For example, in cases where the user 104 has entered a sequence of touch inputs at a measured frequency that is higher than a threshold frequency, an inference may be made that the user 104 is below a certain age (e.g., is a child) given that younger people may input more rapidly to a touch input device. The more rapid sequence of touch inputs may also indicate that the user 104 has smaller hands or smaller fingers, which may indicate a smaller height or lower weight of the user 104.

At 908, the estimate of the at least one physical dimension determined at 906 may be adjusted based on one or more characteristics of the user 104. In some cases the pressure put on the user device 102 may vary based on the gender or the age of the user 104. For example, it may be determined that the touch inputs of women are generally made with less pressure than those of men, or that the touch inputs of younger users (e.g., children) are generally made with less pressure than those of older users. The estimated physical dimensions may thus be adjusted based on one or both of the age or gender of the user 104.

In some implementations, information regarding the location, language preferences, or other demographic data regarding the user 104 may be employed to adjust the estimate of the at least one physical dimension. For example, user(s) 104 who prefer languages that are written from right to left (e.g., Arabic, Hebrew, etc.) may exhibit different patterns of touch inputs than those who preference languages that are written from left to right, and such differences may be employed to refine the user characteristic estimates.

In some cases, the length of the fingernails of the user 104 may affect the pressure of the user's touch inputs to the user device 102. Fingernail length may also affect the area of contact between the user's finger and the touch input device 112, given that a user with longer fingernails may touch the user device 102 more with the pad of the finger and less with the tip. Such variations in pressure or contact area may be measured and used to estimate the fingernail length of the user 104, or to adjust the estimate of other physical dimensions determined at 906. Implementations may also employ other user characteristics to adjust the estimate of the at least one physical dimension.

Figure 10:
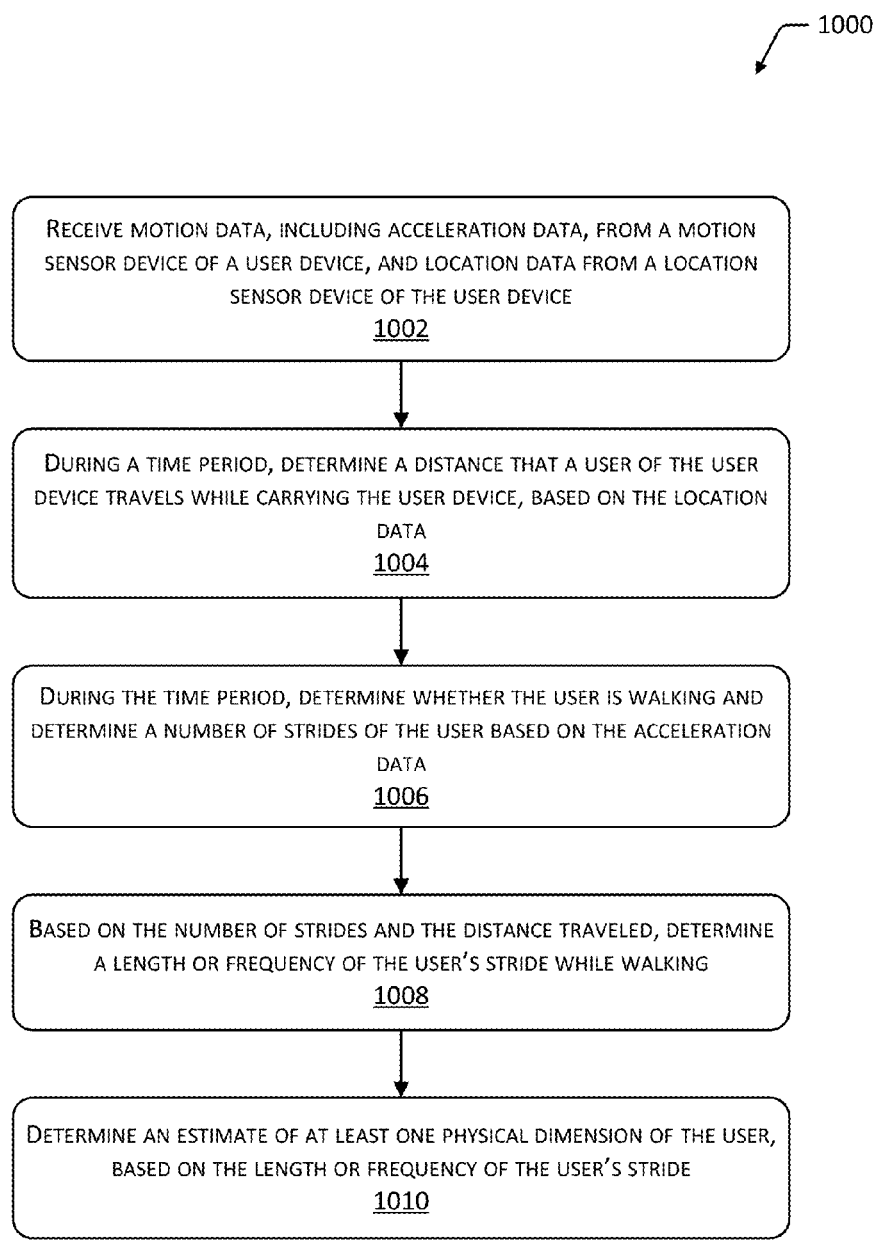
FIG. 10 depicts a flow diagram of a process for using location sensor data and motion sensor data to determine user characteristic(s) by estimating a length of the user's stride while walking.

FIG. 10 depicts a flow diagram 1000 of a process for using location sensor data and motion sensor data to determine user characteristic(s) by estimating a length of the user's stride while walking. Operations of the process may be performed by the characteristic analysis module 126, the application module(s) 216, or other modules executed by the user device(s) 102, the analysis server device(s) 124, or both the user device(s) 102 and the analysis server device(s) 124.

At 1002, sensor data 108 is received from the sensor device(s) 106 of the user device 102, or from external sensor device(s) 134. The sensor data 108 may include motion data describing accelerations (or decelerations) of the user device 102, the motion data generated by an accelerometer or another motion sensor device 114. The sensor data 108 may also include location data describing a location of the user device 102 over time, the location data generated by a GPS receiver, echo-location device, or other location sensor device 118.

At 1004, a determination is made of a distance that the user device 102 travels during a period of time, based on the location data. Alternatively, the determination of the distance may also be based on motion data such as velocity or acceleration data, integrated over time to determine a distance traveled by the user device 102.

At 1006, the motion data may also be employed to determine whether the user 104 is walking, running, or otherwise moving while carrying the user device 102. For example, acceleration data exhibiting a periodic increase in acceleration of the user device 102 may indicate a substantially regular stride of the user 104, with each step causing an acceleration of the user device 102 (e.g., a jolt or a bump). Characteristics of the accelerations and the frequency of the accelerations may be employed to determine whether the user 104 is walking, running, jogging, or is otherwise in motion. The characteristics of the accelerations may also be employed to distinguish instances when the user 104 is riding in a vehicle instead of moving on foot. If it is determined that the user 104 is walking or otherwise moving on foot, a number of strides may be counted during a time period based on the acceleration data.

At 1008, based on the number of strides counted during a time period, and based on the distance traveled by the user device 102 (and the user 104) during that time period, a length and frequency of the user's stride may be estimated. For example, if the user 104 moves 100 meters during a time period, and 110 strides are counted during that time period, then it may be determined that the user's stride is approximately 0.91 meters long. If the time period is 1.5 minutes (90 seconds), it may be determined that the frequency or pace of the user's stride is approximately 1.22 strides per second.

At 1010, an estimate of at least one physical dimension of the user 104 may be determined based on the length or frequency of the user's stride while moving with the user device 102. For example, the length of the user's stride may correspond with a height, a leg length, or a pants size (e.g., inseam size) of the user 104. As another example, the frequency of the user's stride may correspond to an age, gender, weight, or another physical characteristic of the user 104, or may indicate an overall health of the user 104. In some cases, the length or frequency of the user's stride may be used to infer other information, such as the type, style, or size of shoe being worn by the user 104. The length or frequency of the user's stride may also be used to infer a physical capability of the user 104, such as whether the user 104 uses a cane or crutches while walking.

Implementations support using motion data to estimate other types of user characteristics for the user 104. For example, accelerometer data may be used to determine a rate of acceleration or deceleration of the user device 102 while the user 104 is picking up the user device 102. The accelerometer data may then be employed to estimate user characteristics such as an age, physical strength, or overall health of the user 104.

In some implementations, information regarding the location, language preferences, or other demographic data regarding the user 104 may be employed in the estimation of the at least one user characteristic. For example, user(s) 104 in different parts of the world may exhibit a tendency to carry mobile devices in different ways, such as in a pocket, in a handbag, in a backpack, in hand, attached to a belt, and so forth. Such cultural information may be employed to refine estimates of user characteristics based on motion data or other types of the sensor data 108.

Figure 11:
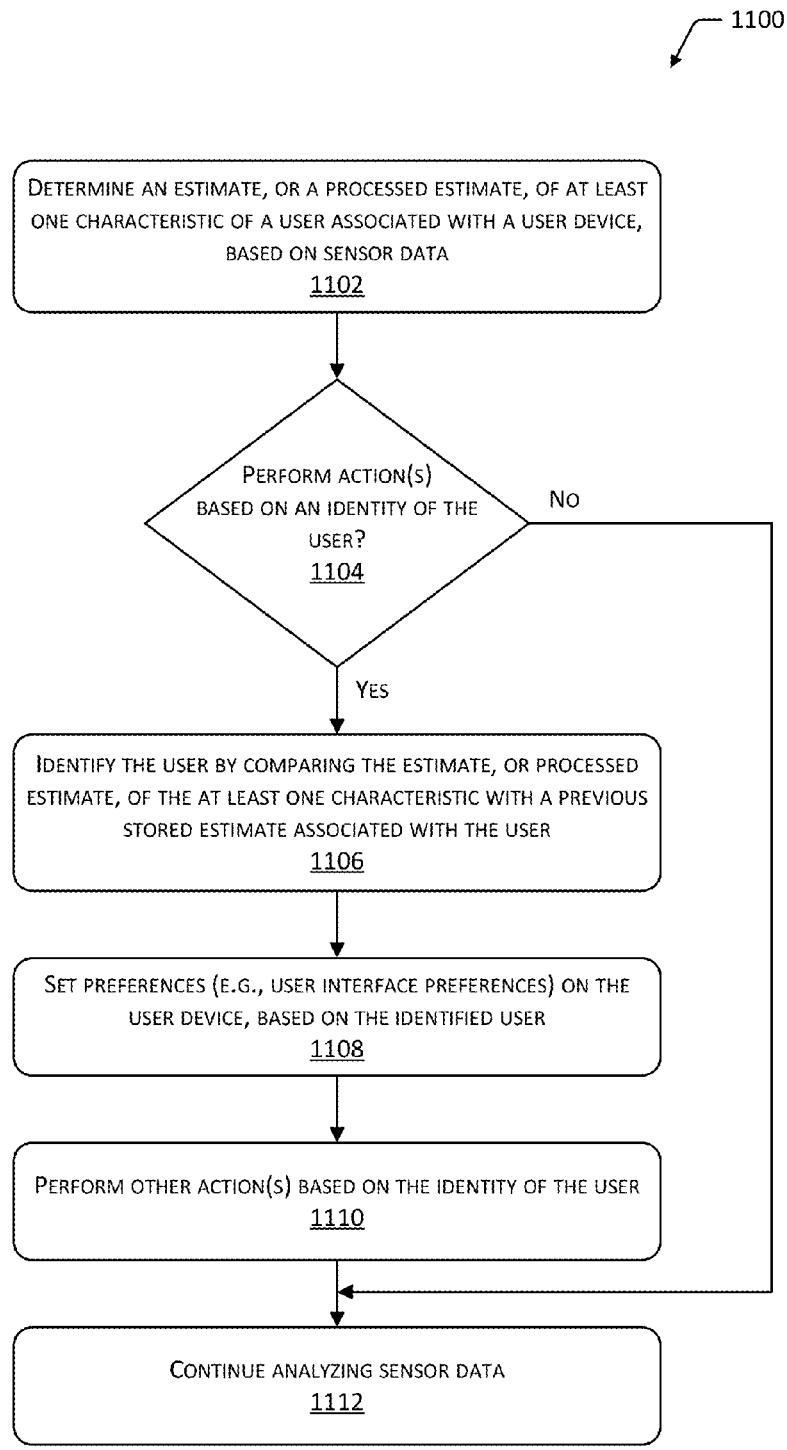
FIG. 11 depicts a flow diagram of a process for identifying a user based on estimated user characteristic(s).

FIG. 11 depicts a flow diagram 1100 of a process for identifying the user 104 based on estimated user characteristics, and performing one or more actions based on the identity of the user 104. Operations of the process may be performed by the characteristic analysis module 126, the application module(s) 216, or other modules executed by the user device(s) 102, the analysis server device(s) 124, or both the user device(s) 102 and the analysis server device(s) 124.

At 1102, an estimate or a processed estimate is determined for at least one user characteristic of the user 104, based on the sensor data 108 as described above. At 1104, a determination is made whether to perform one or more actions based on the identity of the user 104. If so, the process may proceed to 1106. If not, the process may proceed to 1112.

At 1106, the user 104 may be identified by comparing the estimate, or the processed estimate, of the at least one user characteristic with a previously stored estimate for one or more users 104 of the user device 102. In some cases, a user device 102 may be associated with a plurality of users 104, and each of the users 104 may be associated with user characteristic data 128. For example, a user device 102 may have three users 104, with the following user characteristics: Avi, 4 feet tall; Bernice, 5 feet, four inches tall; and Cyril, 5 feet, 11 inches tall. An estimate may be made that a user characteristic for the height of a current user is 5 feet, 10 inches tall, within a certain margin of error. Given that estimate, it may be determined that the current user 104 of the user device 102 is Cyril, with a confidence level of 95%, or Bernice, with a confidence level of 5%.

At 1108, based on the identification of the current user 104, one or more preferences may be set on the user device 102. Such preferences may include user interface preferences, such as a screen color, font size, audio settings, haptic settings, and so forth.

At 1110, one or more other actions may be performed based on the identity of the user 104. Such actions may include providing content that is customized for the user 104, such as particular content delivered through a web site, resuming a video or audio playback previously started by the user 104, resuming a game previously played by the user 104, and so forth. In some cases, the action(s) may include blocking the user's access to content, applications, or functions of the user device 102. For example, if the user 104 is identified as a child, the user's access may be restricted to age-appropriate activities on the user device 102.

At 1112, the process may continue analyzing the sensor data 108 as described herein.

Figure 12:
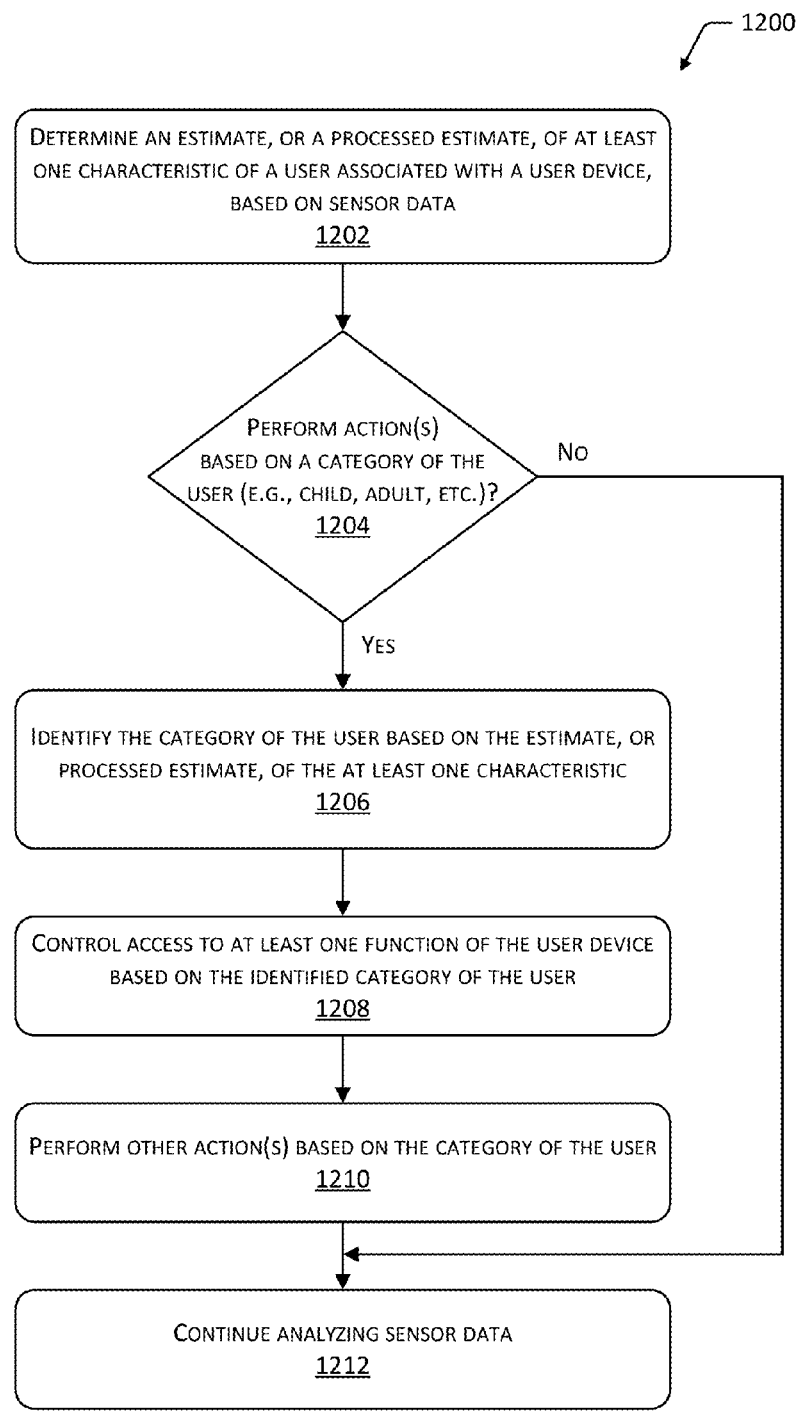
FIG. 12 depicts a flow diagram of a process for determining a category for the user based on estimated user characteristic(s), and regulating the user's activities on the user device based on the determined category.

FIG. 12 depicts a flow diagram 1200 of a process for performing one or more actions based on the estimated user characteristic(s) of the user, including determining a category for the user and regulating the user's activities on the user device based on the determined category. Operations of the process may be performed by the characteristic analysis module 126, the application module(s) 216, or other modules executed by the user device(s) 102, the analysis server device(s) 124, or both the user device(s) 102 and the analysis server device(s) 124.

At 1202, an estimate or a processed estimate is determined for at least one user characteristic of the user 104, based on the sensor data 108 as described above. At 1204, a determination is made whether to perform one or more actions based on a category or a classification of the user 104. If so, the process may proceed to 1206. If not, the process may proceed to 1212.

At 1206, a category or classification of the user 104 may be identified by comparing the estimate, or the processed estimate, of the at least one user characteristic with information that maps various ranges of user characteristics to various categories or classifications of users. For example, a particular range of heights, weights, or other physical dimensions may be associated with users who are under a particular threshold age (e.g., under 18). As another example, a particular range of heights, weights, or other physical dimensions may be associated with users of a particular gender. In some implementations, the identification of the category or classification of the user 104 may include a confidence level or margin of error, given the physical variation among people in a particular user category.

At 1208, access to at least one function, application, or item of content on the user device 102 may be restricted or otherwise controlled, based on the identified category for the user 104. For example, if an inference is made that the current user 104 of the user device 102 is a child (e.g., under 18 years old), based on one or more of the user's height, weight, or other physical dimensions, access to child-inappropriate content may be restricted on the user device 102.

At 1210, one or more other actions may be performed based on the category of the user 104. For example, in some implementations educational content may be automatically displayed on the user device 102 based on an inference that the user 104 is a child. At 1212, the process may continue analyzing the sensor data 108 as described herein.

Figure 13:
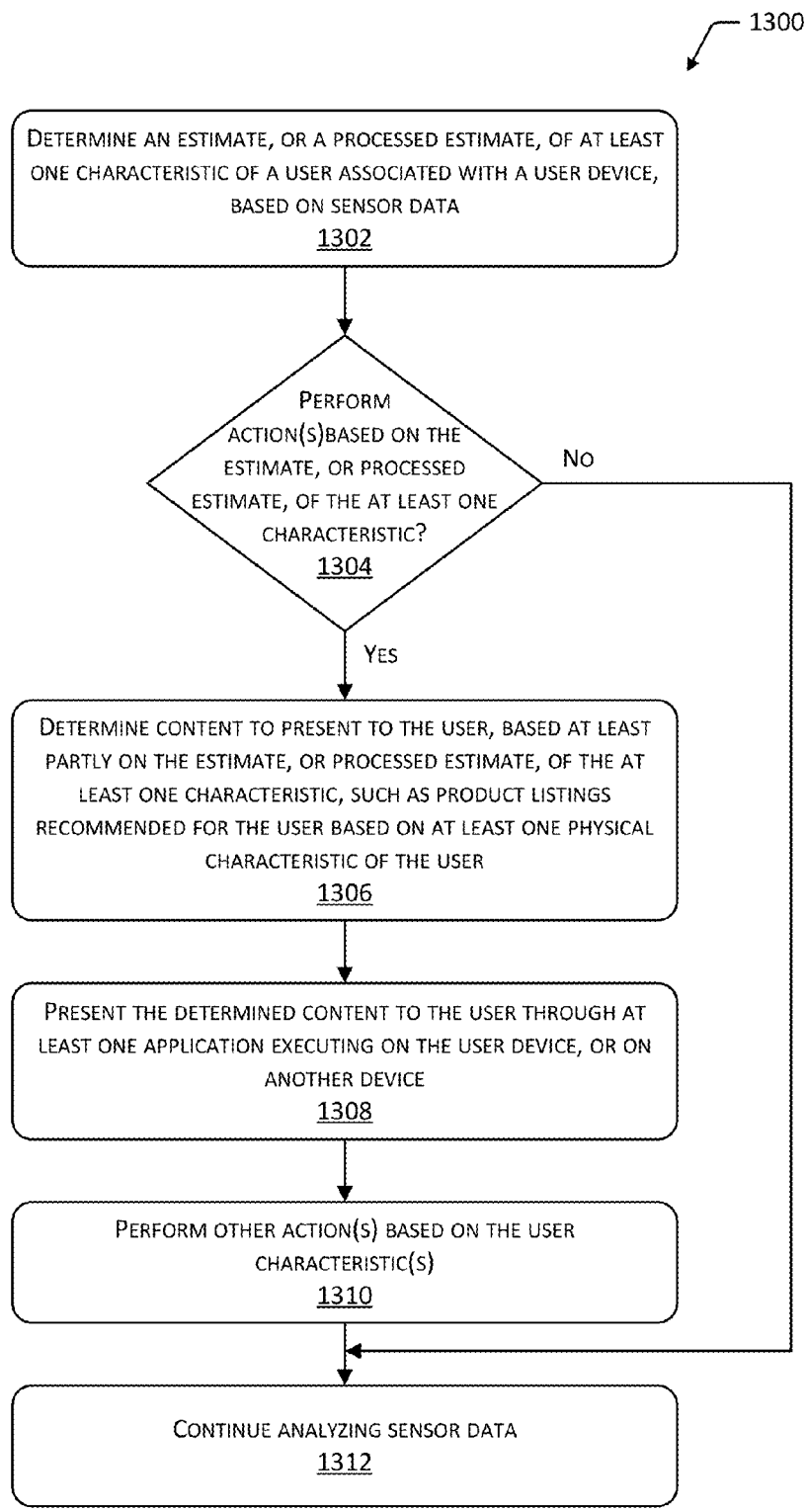
FIG. 13 depicts a flow diagram of a process for determining content to present to the user based on estimated user characteristic(s).

FIG. 13 depicts a flow diagram 1300 of a process for performing one or more actions based on the estimated user characteristic(s) of the user 104, including determining content to present to the user 104 based on the estimated user characteristic(s). Operations of the process may be performed by the characteristic analysis module 126, the application module(s) 216, or other modules executed by the user device(s) 102, the analysis server device(s) 124, or both the user device(s) 102 and the analysis server device(s) 124.

At 1302, an estimate or a processed estimate is determined for at least one user characteristic of the user 104, based on the sensor data 108 as described above. At 1304, a determination is made whether to perform one or more actions based on the estimate or processed estimate of the user characteristic of the user 104. If so, the process may proceed to 1306. If not, the process may proceed to 1312.

At 1306, a determination may be made of content to present to the user 104, based at least partly on the estimate, or processed estimate, of the at least one characteristic. In some implementations, if the user 104 is browsing for particular products or services on an e-commerce web site, content may be identified corresponding to one or more estimated user characteristics of the user 104. For example, an estimate of the user's dress size may have been determined based on sensor data 108 as described herein. When the user 104 is browsing for dresses online, the web site may present dresses within a range of dress sizes corresponding to the estimated dress size for the user 104. Similarly, other estimates of clothing or apparel sizes may be employed to customize or tailor content to a particular user 104.

At 1308, the determined content may be presented to the user 104 through at least one application executing on the user device 102, such as through a web browser. In some cases, the content may be presented to the user 104 on the user device 102 which generated, at least in part, the sensor data 108 on which the estimate of the user characteristic was based. Alternatively, the content may be presented on another device. Implementations support the storage of estimated user characteristics on a cloud server device or other central repository, so that the estimated user characteristics may be used to customize the content delivered to the user 104 on any user device 102 employed by the user 104.

At 1310, one or more other actions may be performed based on the estimated user characteristic(s). At 1312, the process may continue analyzing the sensor data 108 as described herein.

Figure 14:
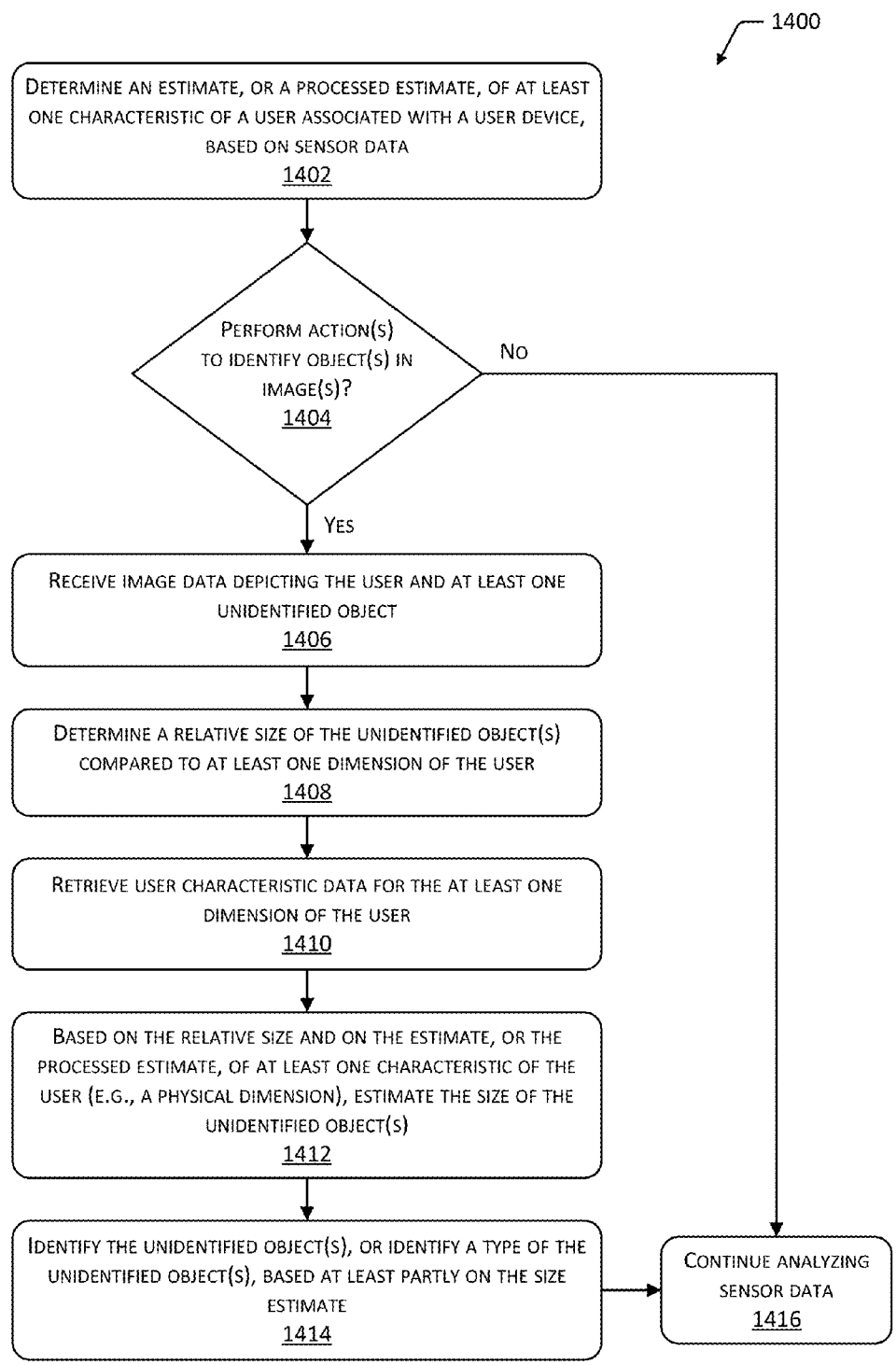
FIG. 14 depicts a flow diagram of a process for identifying an unknown object shown in an image with the user, based on estimated user characteristic(s).

FIG. 14 depicts a flow diagram 1400 of a process for identifying an unknown object shown in an image with the user 104, based on estimated user characteristics for the user 104. Operations of the process may be performed by the characteristic analysis module 126, the application module(s) 216, or other modules executed by the user device(s) 102, the analysis server device(s) 124, or both the user device(s) 102 and the analysis server device(s) 124.

At 1402, an estimate or a processed estimate is determined for at least one user characteristic of the user 104, based on the sensor data 108 as described above. At 1404, a determination is made whether to perform one or more actions to identify one or more unknown objects in an image, based on the estimated user characteristics. If so, the process may proceed to 1406. If not, the process may proceed to 1416.

At 1406, image data may be received including one or more images. In some cases, the image data may be generated by an image capture device 110, or an external sensor device 134. The image data may include one or more images depicting the user 104 and at least one unidentified object. At 1408, a determination may be made of a relative size of each unidentified object to at least one dimension of the user 104 shown in the image data.

At 1410, the user characteristic data 128 may be retrieved, including an estimate or processed estimate for the at least one dimension of the user 104. At 1412, based on the relative size determined at 1408, and based on the estimate of the at least one dimension of the user 104 shown in the image data, an estimate may be made of the size of each of the unidentified objects in the image data.

At 1414, each of the unidentified objects may be identified, based at least in part on the estimated size determined at 1410. Such identification may be based on comparing the estimated size of an unidentified object to data describing the dimensions of various objects. For example, an image may show a user 104 holding an unidentified electronic device. The length of the unidentified electronic device may be estimated as 9 centimeters, based on a current estimate of the height of the user 104 and the relative sizes of the user 104 and the unidentified electronic device as shown in the image. The unidentified electronic device may then be identified as a BrandX smartphone, based on data indicating that particular brand of smartphone is 9 centimeters long.

In some implementations, at 1414 a class, a category, or a type of the unidentified object(s) may be identified based on the estimated dimension(s) of the unidentified object(s). For example, the estimated size of an unidentified object may be employed to infer that the object is within a particular class of electronic device such as a smartphone, instead of being in another class of electronic device such as an electronic book reader, tablet computer, or laptop computer.

At 1416, the process may continue analyzing the sensor data 108 as described herein.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
receiving sensor data from a user device, the sensor data comprising:
image data depicting at least a portion of a user of the user device, the image data provided by an image capture device included in the user device; and
motion data describing a motion of the user device, the motion data provided by a motion sensor device included in the user device;
determining a first estimate of a physical characteristic of the user based on the image data, the physical characteristic comprising at least one of a height or an apparel size of the user;
determining a second estimate of the physical characteristic of the user based on the motion data;
processing the first estimate and the second estimate to determine a processed estimate of the physical characteristic of the user; and
based on the processed estimate, determining content to present through an application executed on the user device, wherein the content comprises at least one item recommended for the user based on the physical characteristic of the user.

2. The method of claim 1, wherein the determining of the first estimate further comprises:
identifying a reference object depicted in the image data;
retrieving size information that describes a predetermined size of at least one dimension of the reference object;
based on the image data, determining a proportion of the physical characteristic of the user to the at least one dimension of the reference object; and
determining the first estimate as a multiplicative product of the predetermined size and the proportion.

3. The method of claim 1, wherein the determining of the second estimate further comprises:
determining a vertical distance traveled by the user device during the motion, based at least partly on the motion data;
receiving device usage data indicating an activity performed on the user device, the activity performed during a time period that at least partly coincides with the motion;
based on the device usage data indicating that the activity comprises engaging in a telephone call, determining that the vertical distance corresponds to a difference between a first elevation of the user device and a second elevation of the user device, the first elevation corresponding to a resting position of the user device prior to the telephone call, and the second elevation corresponding to an ear of the user; and
determining the second estimate based on the vertical distance.

4. The method of claim 1, wherein processing the first estimate and the second estimate to determine the processed estimate further comprises calculating the processed estimate as an average of the first estimate and the second estimate.

5. A system, comprising:
a memory storing computer-executable instructions; and
a processor in communication with the memory, the processor configured to execute the computer-executable instructions to cause the processor to:

receive first sensor data from a first sensor device included in a user device;

receive second sensor data from a second sensor device included in the user device, the second sensor device being different than the first sensor device;

determine a first estimate of a physical characteristic of a user associated with the user device, based at least partly on the first sensor data;

determine a second estimate of the physical characteristic of the user, based at least partly on the second sensor data;

process the first estimate and the second estimate to determine a third estimate of the physical characteristic of the user;

perform one or more actions that are customized based at least partly on the third estimate of the physical characteristic; and wherein the one or more actions comprise:
 identifying one or more products having a size that corresponds to the third estimate of the physical characteristic of the user; and
 presenting content describing the one or more products.

6. The system of claim 5, wherein the physical characteristic includes one or more of a weight, an apparel size, an age, a gender, a height, a width, a size of at least one body part of the user, an item of apparel worn by the user, or a physical capability of the user.

7. The system of claim 5, wherein the first sensor device and the second sensor device comprise one or more of a camera, an accelerometer, a gyroscope, a magnetometer, a geolocation device, a barometer, an altimeter, or a touch-sensitive display.

8. The system of claim 5, wherein the one or more actions comprise:
 identifying the user based at least partly on the third estimate of the physical characteristic, and
 customizing at least one feature of the user device, based on a stored preference of the identified user.

9. The system of claim 5, wherein:
the physical characteristic includes an age of the user; and
the one or more actions comprise controlling access to at least one of a function, an application, or a content item on the user device based on the third estimate of the physical characteristic including the age of the user.

10. The system of claim 5, wherein the one or more actions comprise:
based at least partly on the third estimate of the physical characteristic, determining content to present on the user device.

11. The system of claim 5, wherein:
at least one of the first sensor data and the second sensor data comprises image data that depicts an object and at least a portion of the user;
the physical characteristic includes a dimension of at least the portion of the user depicted in the image data; and
the one or more actions comprise:
 based on the image data, determining a proportion between a size of the object and at least the portion of the user;
 estimating the size of the object, based on the proportion and the third estimate of the dimension of at least the portion of the user; and
 identifying a type of the object depicted in the image data, based at least partly on the size of the object.

12. A computer-implemented method, comprising:
receiving sensor data from at least two sensor devices;
processing the sensor data from the at least two sensor devices to determine at least two independent estimates of a physical dimension of a user of a user device;
processing the at least two independent estimates of the physical dimension, to determine a processed estimate of the physical dimension of the user;
performing one or more actions that are customized based at least in part on the processed estimate of the physical dimension of the user; and
wherein the one or more actions comprise:
 selecting, from a plurality of items, at least one item that is recommended for the user based at least partly on the processed estimate of the physical dimension of the user; and
 presenting, on the user device, content describing the at least one item recommended for the user.

13. The method of claim 12, further comprising:
processing the processed estimate with at least one previously determined estimate of the physical dimension, to update the processed estimate of the physical dimension.

14. The method of claim 12, wherein the physical dimension of the user comprises a height, a weight, a width, an apparel size, an age, a gender, a body part dimension of the user, an item of apparel worn by the user, or a physical capability of the user.

15. The method of claim 12, further comprising:
receiving the sensor data comprising image data that depicts a reference object and at least a portion of the user, wherein the reference object has at least one predetermined dimension; and
determining one of the at least two independent estimates of the physical dimension of the user, based at least partly on a comparison of the predetermined dimension of the reference object depicted in the image data to the physical dimension of the user depicted in the image data.

16. The method of claim 12, further comprising:
receiving the sensor data comprising motion data describing a motion of the user device;
determining a vertical distance traveled by the user device during the motion, based at least partly on the motion data;
receiving device usage data indicating an activity performed on the user device, the activity occurring during a time period that at least partly coincides with the motion, the activity being characterized by a characteristic motion performed during the activity; and
determining one of the at least two independent estimates of the physical dimension of the user, based on associating the characteristic motion with the vertical distance traveled by the user device.

17. The method of claim 12, further comprising:
receiving the sensor data comprising atmospheric pressure data describing an atmospheric pressure change at the user device;
receiving device usage data indicating an activity performed on the user device, the activity including a motion of the user device during a time period that at least partly coincides with the atmospheric pressure change, the activity being characterized by a characteristic motion performed during the activity;
determining an altitude change of the user device during the motion, based at least partly on the atmospheric pressure change; and determining one of the at least two independent estimates of the physical dimension of the user, based on associating the characteristic motion with the altitude change.

18. The method of claim 12, further comprising:

receiving the sensor data comprising touch input data describing a tactile pressure placed on the user device by the user while interacting with the user device; and determining one of the at least two independent estimates of the physical dimension of the user based at least partly on the tactile pressure placed on the user device by the user.

19. The method of claim 1, wherein the item comprises one or more of apparel or accessories.

20. The method of claim 12, further comprising:

receiving the sensor data comprising motion data and acceleration data, determining a distance traveled by the user of the user device during a time period;

during the time period, determining a number of strides of the user during the distance traveled, based at least partly on the acceleration data;

during the time period, determining a length and frequency of the strides based at least partly on the number of strides and the distance traveled; and determining one of the at least two independent estimates of the physical dimension of the user based at least partly on the length and frequency of the strides.

* * * * *